United States Patent
Miyashita

(10) Patent No.: US 6,801,250 B1
(45) Date of Patent: Oct. 5, 2004

(54) CONVERTING A MULTI-PIXEL IMAGE TO A REDUCED-PIXEL IMAGE TO PROVIDE AN OUTPUT IMAGE WITH IMPROVED IMAGE QUALITY

(75) Inventor: Satoshi Miyashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 750 days.

(21) Appl. No.: 09/657,932

(22) Filed: Sep. 8, 2000

(30) Foreign Application Priority Data

Sep. 10, 1999 (JP) .......................................... P11-258098

(51) Int. Cl.$^7$ ........................ H04N 5/225; H04N 5/262; H04N 5/228

(52) U.S. Cl. .............................. 348/220.1; 348/240.2; 348/208.99; 348/208.13; 348/208.6

(58) Field of Search .......................... 348/240.2, 220.1, 348/208.6, 208.13, 208.99

(56) References Cited

U.S. PATENT DOCUMENTS

| | | | |
|---|---|---|---|
| 4,903,132 A | | 2/1990 | Yamawaki |
| 4,910,599 A | * | 3/1990 | Hashimoto ............... 348/240.2 |
| 5,060,074 A | * | 10/1991 | Kinugasa et al. ........ 348/208.6 |
| 5,497,192 A | * | 3/1996 | Ishizuka ............... 348/208.13 |
| 5,502,483 A | * | 3/1996 | Takase et al. ........... 348/208.13 |
| 5,502,484 A | * | 3/1996 | Okada .................... 348/208.6 |
| 5,650,819 A | * | 7/1997 | Sato et al. ............. 348/240.99 |
| 5,657,082 A | | 8/1997 | Harada et al. |
| 5,712,474 A | * | 1/1998 | Naneda ................... 250/208.1 |
| 6,002,429 A | * | 12/1999 | Ochi et al. ............... 348/220.1 |
| 6,100,927 A | * | 8/2000 | Ogino ................... 348/208.14 |
| 6,122,004 A | * | 9/2000 | Hwang ................... 348/208.13 |
| 6,211,910 B1 | * | 4/2001 | Kino et al. ............ 348/208.99 |
| 6,489,993 B1 | * | 12/2002 | Sato et al. ............... 348/240.3 |

FOREIGN PATENT DOCUMENTS

| | | |
|---|---|---|
| EP | 0 748 111 | 12/1996 |
| WO | WO 97 40621 | 10/1997 |

OTHER PUBLICATIONS

Imaide T et al: "A Multimedia Color Camera Providing Multi-Format Digital Images" IEEE Transactions on Consumer Electronics, IEEE Inc. New York, US, vol. 39, No. 3, Aug. 1, 1993, pp. 467–472, XP000396320 ISSN: 0098–3063.

* cited by examiner

Primary Examiner—Wendy R. Garber
Assistant Examiner—James M. Hannett
(74) Attorney, Agent, or Firm—Frommer Lawrence & Haug LLP; William S. Frommer; Samuel S. Lee

(57) ABSTRACT

A CCD image sensor 14 uses sufficiently more pixels than those in an output image. A pixel number conversion block applies pixel number reduction conversion to an image pickup signal from the CCD image sensor 14. This signal is output as a monitor output or motion-picture recording signal via a terminal 43. Converting the multi-pixel image signal to a reduced image can provide an output image with improved sharpness.

14 Claims, 20 Drawing Sheets

FIG.1

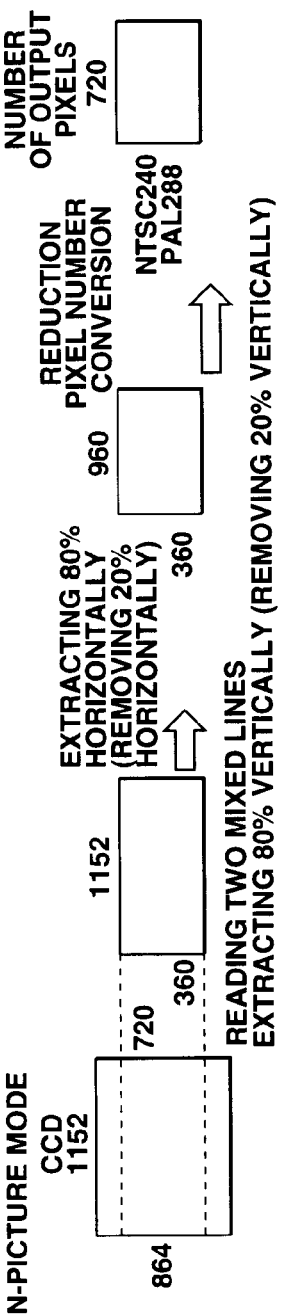
FIG.4A MOTION-PICTURE MODE
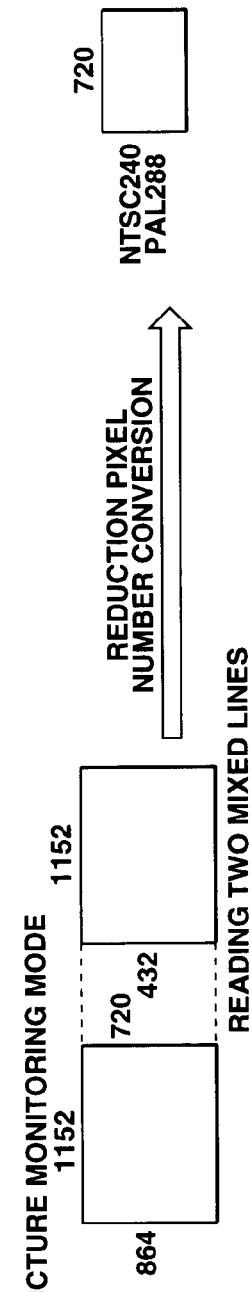
FIG.4B STILL-PICTURE MONITORING MODE
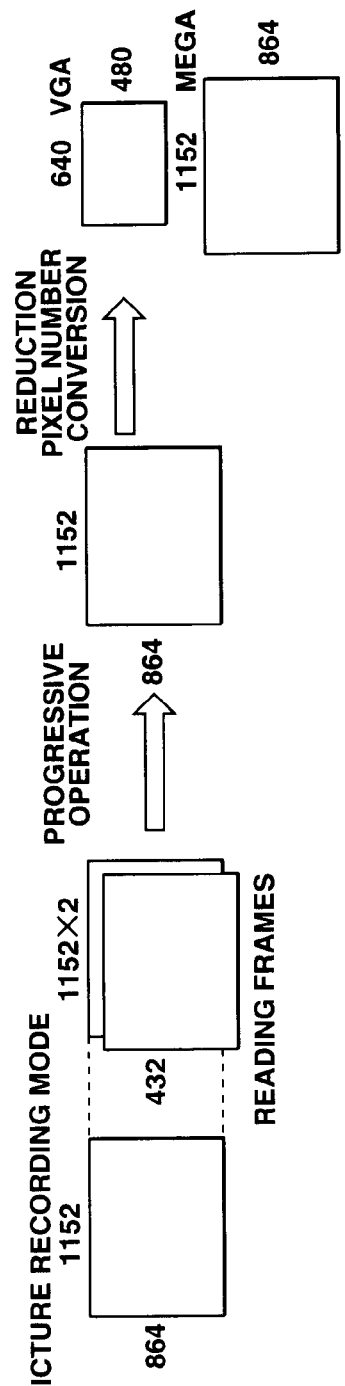
FIG.4C STILL-PICTURE RECORDING MODE

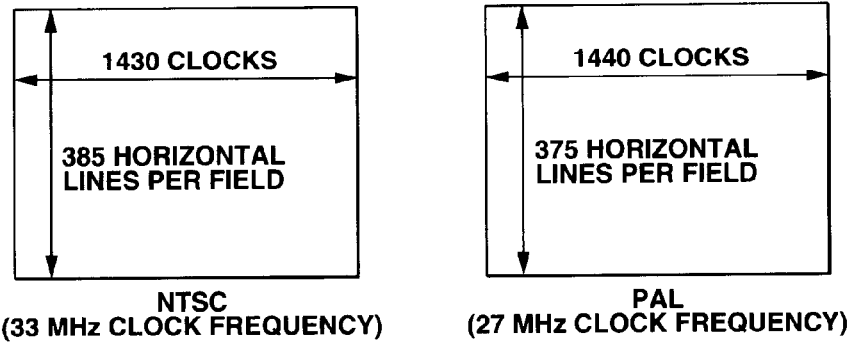
FIG.5A NTSC (33 MHz CLOCK FREQUENCY)
FIG.5B PAL (27 MHz CLOCK FREQUENCY)
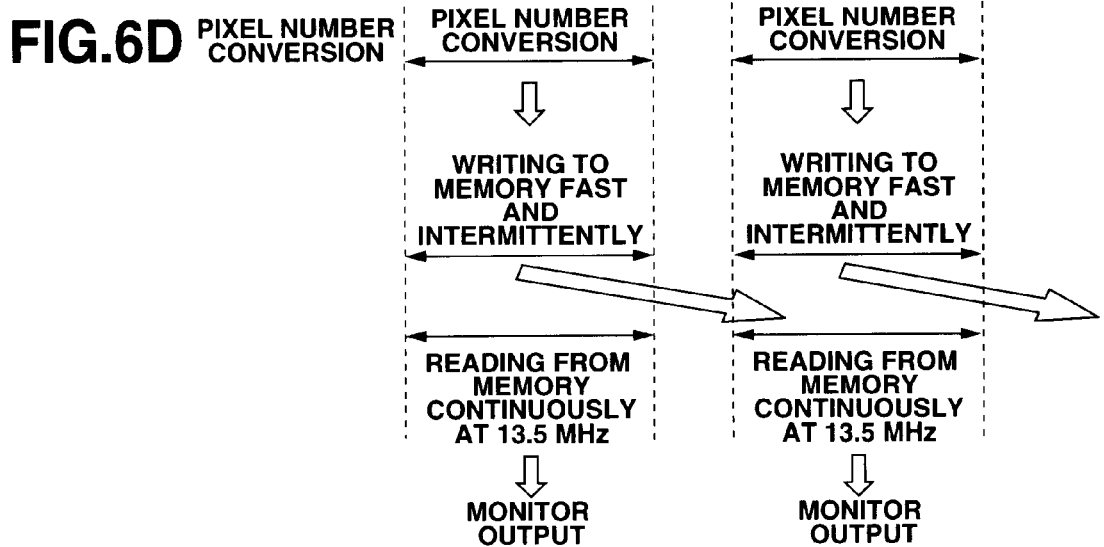

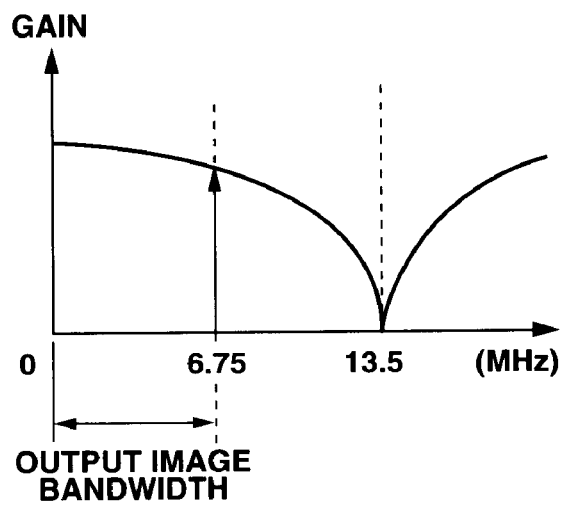
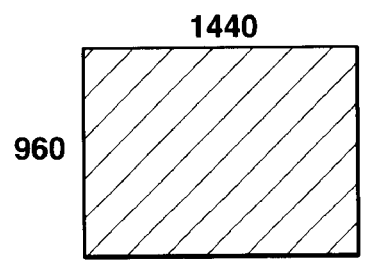
FIG.13A  FIG.13B
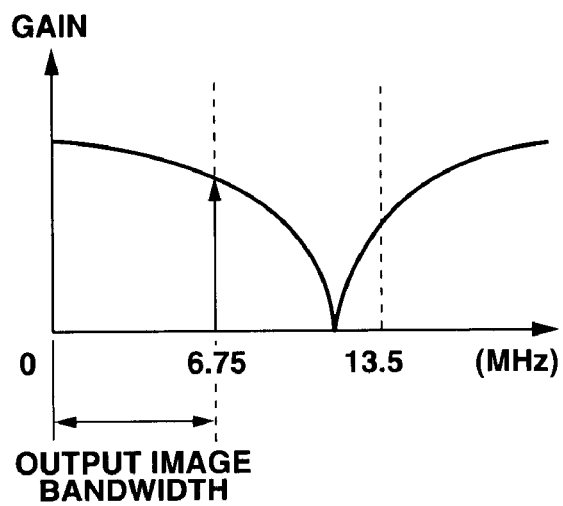
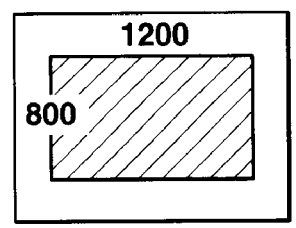
FIG.14A  FIG.14B

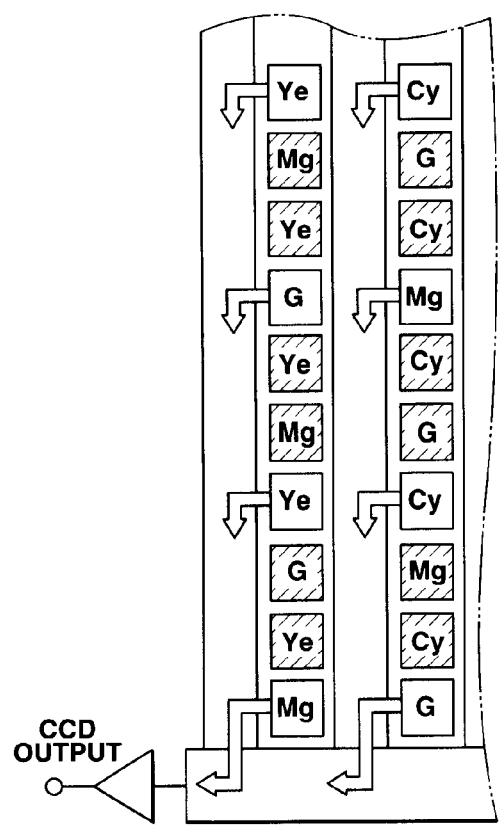 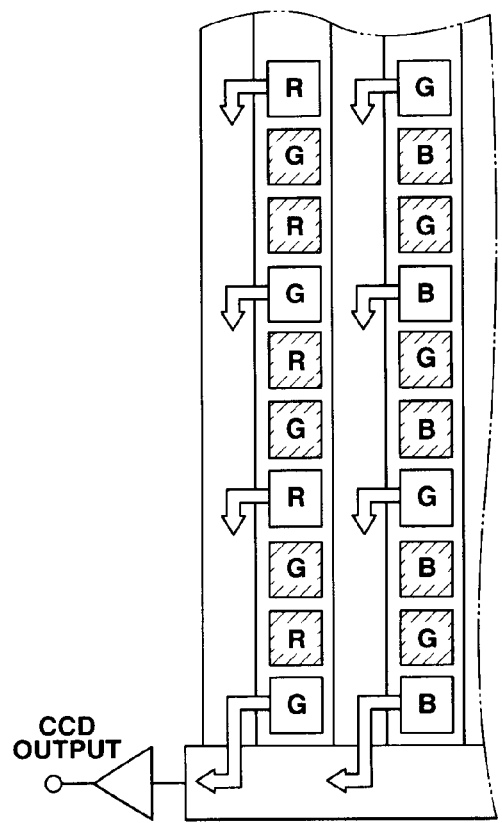
FIG.19A      FIG.19B

CONVERTING A MULTI-PIXEL IMAGE TO A REDUCED-PIXEL IMAGE TO PROVIDE AN OUTPUT IMAGE WITH IMPROVED IMAGE QUALITY

BACKGROUND OF THE INVENTION

1. [Technical Field of the Invention]

The present invention relates to an image pickup apparatus. More specifically, the present invention relates to an image pickup apparatus which can be used for a video camera having a motion-picture mode and a still-picture mode.

2. [Prior Art]

Video cameras for taking motion pictures use solid-state image pickup elements such as CCD image sensors whose pixel array chiefly complies with the NTSC/PAL for output signal formats. For example, a video camera based on the DV format, one of home-use digital VTR standards, generally uses approximately 340,000 to 420,000 pixels.

Image pickup using a solid-state image pickup element such as a CCD image sensor is equivalent to spatial sampling. It is a common practice to install an optical low-pass filter in an image pickup optical system for preventing image quality degradation due to aliasing components such as jagged edges in an image and false colors in a high-frequency portion. These aliasing components result from a sampling carrier caused by a pixel pitch itself or caused by repeated color filters formed on pixels.

The above-mentioned optical low-pass filter cannot easily provide flat frequency characteristics up to a high frequency and decreases high frequency components in an image, degrading the resolution.

Especially, a color camera system using a single CCD allows a single CCD image sensor to generate the brightness and colors, forming different color filters for respective pixels. It is necessary to prevent image quality degradation due to aliasing components resulting from a sampling carrier generated by this color coding. For this purpose, such a color camera system must limit the band to a low spatial frequency, further degrading the resolution, in contrast to a camera system without having the color coding. For example, the color coding of two repetitions such as "Ye, Cy, Ye, Cy" must limit the band to a half of the frequency for a monochrome image pickup system or a 3-CCD camera system which separates light into RGB components using a prism.

The NTSC/PAL for output signal formats specifies the number of pixels in an array. Some CCD image sensors follow this specification. Most of these CCD image sensors use rectangular pixels. This means that an NTSC color system, for example, often uses 720 pixels (horizontal) by 480 lines (vertical) as an effective combination of the horizontal resolution (the number of samples) and the number of lines in a vertical direction within an effective display screen. The NTSC color system displays these pixels on a standard television screen having a horizontal-vertical ratio of 4:3. This provides a single pixel in the CCD image sensor with a tall shape having a horizontal-vertical ratio of 8:9. If this single pixel is handled as is and is displayed on a PC (personal computer) monitor which processes pixels as tetragonal lattices, an image is displayed with an incorrect aspect ratio (vertical-horizontal ration). A pixel number conversion is required for display with a correct aspect ratio.

A CCD image sensor for video cameras generally uses the different numbers of pixels in a vertical direction depending on scanning densities for various NTSC or PAL format. This makes cost-saving difficult.

When an image picked up by the CD image sensor is electronically enlarged, i.e. electronically zoomed, the image is degraded the resolution in inverse proportion to the magnification. This causes a disadvantage of providing a poor image quality compared to zooming through the use of an optical lens.

BRIEF SUMMARY OF THE INVENTION

The present invention has been made in consideration of the foregoing. It is an object of the present invention to provide an image pickup apparatus which can: increase resolutions by improving output image characteristics at high frequencies; easily generate an image with pixels as tetragonal lattices; use a CCD image sensor for both NTSC and PAL video format; and perform electronic zooming without image quality degradation.

For solving the above-mentioned problems, an image pickup apparatus according to the present invention is characterized by having: an image pickup element which uses more pixels than those in an output image; and pixel number conversion means which converts an intermediate image signal to an output image signal using a pixel number reduction conversion.

Therein, the intermediate image signal which is created from an image pickup signal of the above-mentioned image pickup element contains more pixels than those in the output image.

The above-mentioned image pickup apparatus has a motion-picture mode and a still-picture mode. In the motion-picture mode, the image pickup apparatus extracts a signal for the intermediate image from an image pickup area in the image pickup element. The intermediate image contains fewer pixel than contained in the image pickup element and more pixels than contained in the output image. In the still-picture mode, the image pickup apparatus reads the entire image pickup area in the image pickup element to create a signal for the intermediate image.

The above-mentioned image pickup element uses a CCD image sensor which provides tetragonal-lattice pixels.

The above-mentioned pixel number conversion means performs zooming by varying conversion ratios in the intermediate image signal.

The image pickup apparatus according to the present invention is provided with an image pickup element which uses more pixels than those in an output image; and pixel number conversion means which converts an intermediate image signal to an output image signal using a pixel number reduction conversion.

Therein, the intermediate image signal which is created from an image pickup signal of the above-mentioned image pickup element contains more pixels than those in the output image.

Therefore, the image pickup apparatus can improve image characteristics at high frequencies and increase resolution or sharpness.

The image pickup apparatus has a motion-picture mode and a still-picture mode. In the motion-picture mode, the image pickup apparatus extracts a signal for the intermediate image from an image pickup area in the image pickup element. The intermediate image contains fewer pixels than contained in the image pickup element and more pixels than contained in the output image. In the still-picture mode, the image pickup apparatus reads the entire image pickup area in the image pickup element to create a signal for the intermediate image. Consequently, in the motion-picture mode, the image pickup apparatus can perform a camera-shake correction and generate an output image with improved resolution or sharpness of the read image. In the still-picture mode, the image pickup apparatus can provide an output image by optimizing the image pickup element resolution.

The above-mentioned image pickup element uses a CCD image sensor which provides tetragonal-lattice pixels. Using this image pickup element, the image pickup apparatus can easily display images with a correct aspect ratio on a PC (personal computer) monitor. Different output image formats are used for NTSC/PAL systems. By varying ratios of the above-mentioned pixel number conversion, it is possible to use a CCD image sensor common to both systems, easily switch between these systems, and provide advantageous cost saving.

In addition, zooming is available by varying conversion ratios of the above-mentioned pixel number conversion means. A digital camera using a single-focus lens can perform zooming with minimal image quality degradation. A digital camera using an optical zoom lens can increase zoom magnifications.

BRIEF DESCRIPTION OF THE SEVERAL VIEWS OF THE DRAWING

FIG. 1 is a block diagram showing the scheme of a video camera as an embodiment of the image pickup apparatus according to the present invention;

FIG. 4 shows the number of pixels in an image pickup signal and an output image as well as associated information in each mode;

FIG. 5 illustrates CCD read clock frequencies for NTSC and PAL systems;

FIG. 6 is a timing chart describing operations in the motion-picture mode;

FIG. 13A shows frequency characteristics when a reduction rate is set to ½;

FIG. 13B shows a displayable image range when a reduction rate is set to ½;

FIG. 14A shows frequency characteristics when a reduction rate is set to ⅗;

FIG. 14B shows a displayable image range when a reduction rate is set to ⅗;

FIG. 19A Illustrates a line thinning operation when monitoring an image from the CCD image sensor;

FIG. 19B illustrates a line thinning operation when monitoring an image from the CCD image sensor;

DETAILED DESCRIPTION OF THE INVENTION

Figure 2:
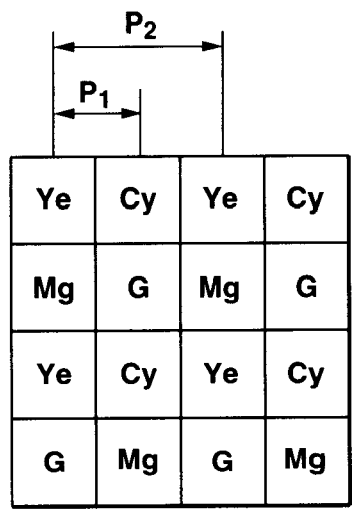
FIG. 2 illustrates an example of a complementary mosaic color coding filter on a CCD image sensor.

Embodiments of an image pickup apparatus according to the present invention will be described in detail, with reference to the accompanying drawings.

Figure 1:
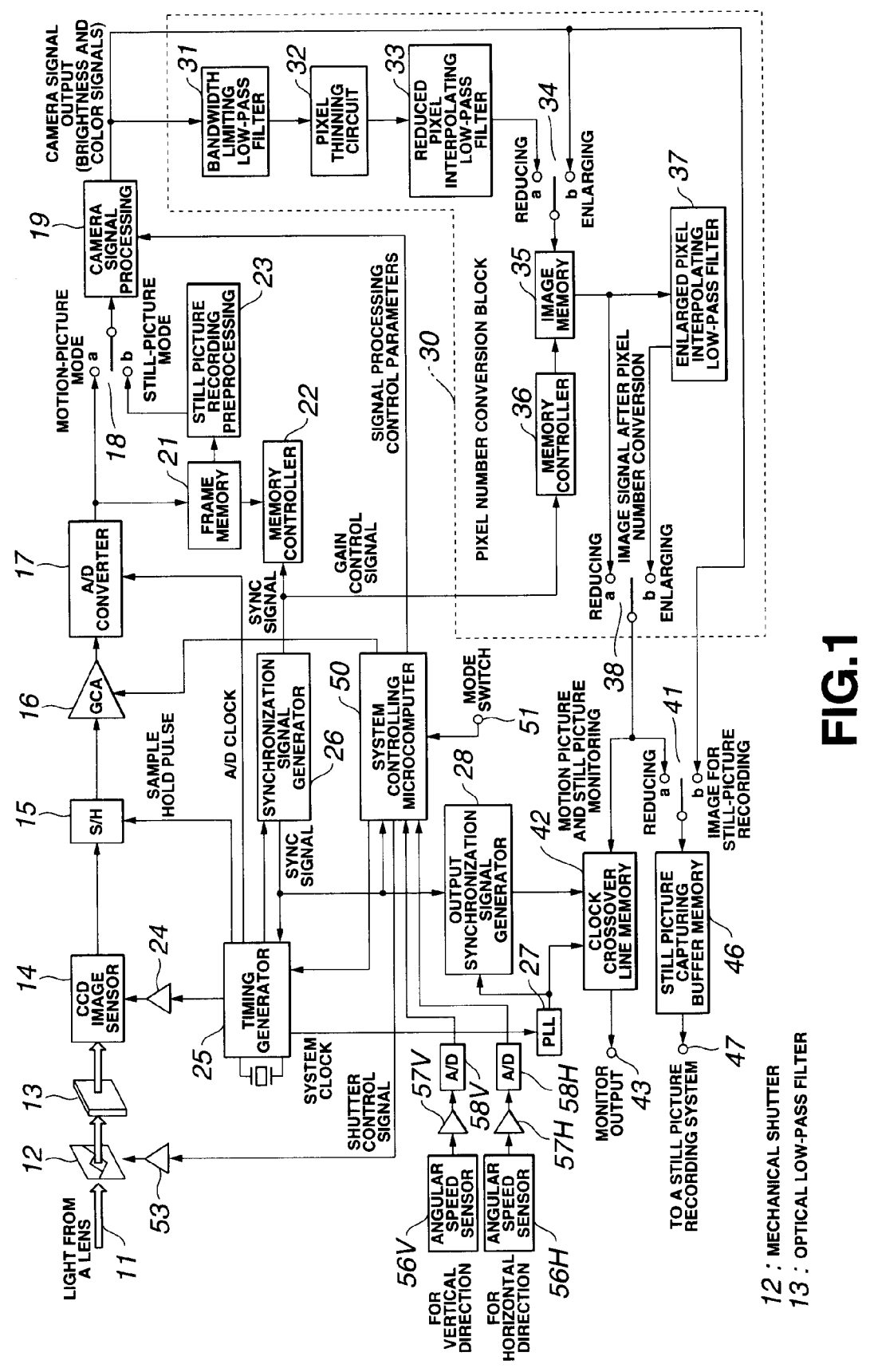

FIG. 1 is a block diagram showing the scheme of a video camera system as an embodiment of the image pickup apparatus according to the present invention. This video camera in FIG. 1 support two image pickup modes for motion pictures and still pictures. The video camera outputs a motion picture in 720 pixels (horizontal) by 480 lines (vertical) using a so-called DV format which is a digital VTR standard for home use. A CCD image sensor 14 uses much more pixels than those in an output image. More specifically, the CCD image sensor uses megapixels such as 1,152 pixels (horizontal) by 864 lines (vertical).

In FIG. 1, the video camera system performs an image pickup operation by transferring light 11 from an optical lens in a camera unit to a shutter 12 such as a mechanical shutter, to an optical low-pass filter 13, and then to a CCD image sensor 14 working as an image pickup element. During a still picture image pickup operation, the shutter 12 controls exposure time and maintains a light blocking effect when a signal is read from the CCD. In this embodiment, the shutter 12 is also used as an iris for dynamically adjusting brightness during an image pickup operation for motion pictures. The optical low-pass filter 13 suppresses image quality degradation due to spatial sampling during image pickup in the CCD image sensor 14. More specifically, the optical low-pass filter 13 suppresses image quality degradation due to aliasing components such as jagged edges in an image and false colors in a high-frequency portion. These aliasing components result from a sampling carrier caused by a pixel pitch itself or caused by repeated color filters formed on pixels. The CCD image sensor 14 photoelectrically converts an image signal. A charge transfer operation reads the converted image signal corresponding to any one of three modes: a motion-picture mode, a still-picture monitoring mode, and a still-picture recording mode. The image signal is then sent to a signal processing system.

A sample hold (S/H) circuit 15 in the signal processing system performs correlation double sampling (CDS) for detecting an electric charge which is photoelectrically converted in the CCD and is stored for each pixel. A signal from this sample hold circuit 15 is sent to a gain control amplifier (GCA) 16, and then to an A/D conversion circuit 17 in which that signal is converted from an analog to digital form. An output from the A/D conversion circuit 17 is sent to a terminal "a" of a motion/still-picture selection switch 18 and to frame memory 21 for still pictures. The terminal "a" is selected for motion pictures. A control signal from a memory controller 22 controls write or read operations for the frame memory 21. A signal read from the frame memory 21 is sent to a still picture recording preprocessing circuit 23, and then to a terminal "b" of the selection switch 18. The terminal "b" is selected for still pictures. An output signal from the selection switch 18 is sent to a camera signal processing circuit 19. Therein, the output signal is subject to signal processing such as a Y (brightness) process and a C (chromaticness) process, and then is sent to a pixel number conversion block 30.

An output signal from the camera signal processing circuit 19 is sent to the pixel number conversion block 30. In this block, the output signal passes a band limiting low-pass filter 31, a pixel thinning circuit 32, and a reduced pixel interpolating low-pass filter 33, and then is sent to a selected terminal "a" of a selection switch 34. A selected terminal "b" of the selection switch 34 is supplied with an output signal as is from the camera signal processing circuit 19. An output signal from the selection switch 34 is sent to image memory 35 which is controlled by a memory controller 26. An image signal read from this image memory 35 is sent to an enlarged pixel interpolating low-pass filter 37, and then to a selected terminal "a" of a selection switch 38. An output signal from the enlarged pixel interpolating low-pass filter 37 is sent to a selected terminal "b" of the selection switch 38. Described above is an example of internal configuration in the pixel number conversion block 30.

An output signal from the selection switch 38 in the pixel number conversion block 30 is sent to a selected terminal "a" of a selection switch 41 and to clock crossover line memory 42. An output signal from the clock crossover line memory 42 is retrieved from an output terminal 43 as a monitor output and is sent to a monitor display system or a motion picture recording system. A selected terminal "b" of the selection switch 41 is supplied with an output signal from the above-mentioned camera signal processing circuit 19. An output signal from this selection switch 41 is temporarily stored in a still picture capturing buffer memory 46. The temporarily stored signal is retrieved as an image signal for recording still pictures via an output terminal 47, and then is sent to a still picture recording system.

A timing generator 25 generates various clocks based on a reference clock generated from a quartz oscillator or the like. A clock for driving the CCD is sent to the CCD image sensor 14 via a driver 24. A sample hold pulse is sent to the sample hold circuit 15. An A/D conversion clock is sent to the A/D conversion circuit 17. A clock for generating synchronization signals is sent to a synchronization signal generator 26. A system clock is sent to a PLL (phase-lock loop) circuit 27. A synchronization signal from the synchronization signal generator 26 is sent to a memory controller 22, the timing generator 25, an output synchronization signal generator 28, and a system controlling microcomputer 50. An output signal from the PLL circuit 27 is sent to the output synchronization signal generator 28 and clock crossover line memory 42. An output signal from the output synchronization signal generator 28 is sent to the clock crossover line memory 42.

The system controlling microcomputer 50 controls the entire system in accordance with selected operation mode and the like. A mode selection signal is entered via a terminal 51. The system controlling microcomputer 50 sends a shutter control signal to the shutter 12 via a driver 53, a gain control signal to the gain control amplifier (GCA) 16, signal processing control parameters to the camera signal processing circuit 19, and control signals for mode selection, camera-shake correction and the like to the timing generator 25. A detection signal from an angular speed sensor 56V for vertical direction is sent to an amplifier 57V, to an A/D converter 58V, and then to the system controlling microcomputer 50. A detection signal from an angular speed sensor 56H for horizontal direction is sent to an amplifier 57H, to an A/D converter 58H, and then to the system controlling microcomputer 50.

FIG. 2 illustrates an example of color coding for a color filter placed on the CCD image sensor 14. A single-CCD color camera system uses a single CCD to generate both brightness and color components. A filter is differently colored for each pixel and is formed on the CCD surface. FIG. 2 shows an example of complementary mosaic color coding at an interval of two pixels horizontally. Sampling interval $p_1$ corresponds to a repetition of a single pixel. Sampling interval $p_2$ provides color coding with a repetition of two pixels and doubles $p_1$, namely $p_2=2p_1$. Given that Fs is a sampling carrier frequency (sampling frequency) using a single-pixel interval, the sampling carrier frequency for color coding with a repetition of two pixels becomes Fs/2.

Figure 3:
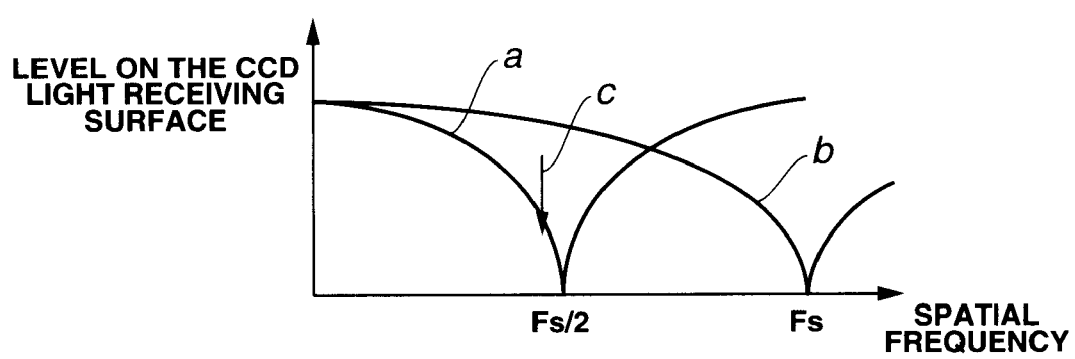
FIG. 3 shows frequency characteristics of an optical low-pass filter installed before the CCD image sensor.

FIG. 3 shows an example for frequency characteristics of the above-mentioned optical low-pass filter 13. A curve "a" indicates frequency characteristics of the optical low-pass filter for the CCD image sensor 14 having the above-mentioned color coding with a 2-pixel repetition. A curve "b" indicates frequency characteristics of the optical low-pass filter for a 3CCD camera system not having the above-mentioned color coding with a 2-pixel repetition. For example, such a camera system is used for monochrome image pickup or separates light into RGB components using a color separation prism for image pickup. As seen from these curves "a" and "b", the CCD image sensor having the above-mentioned color coding with a 2-pixel repetition must have band limitation to a narrow spatial frequency bandwidth. This spatial frequency bandwidth is half the frequency bandwidth of the camera system not having the color coding, thus the resolution is degraded because of the band limitation. In this case, it is difficult to provide the optical low-pass filter with flat frequency characteristics up to a high frequency. A high frequency component in the image is attenuated as indicated with an arrow "c", thus the resolution is degraded.

The embodiment of the present invention improves high frequency characteristics for output images by using the CCD image sensor having more pixels than in an output image. Further, based on an image-pickup signal, the pixel number reduction conversion is applied to an image signal containing more pixels than in an output image.

FIG. 4A, FIG. 4B, FIG. 4C show the number of pixels for the CCD image sensor used in a system according to this embodiment and illustrates how many pixels are used for above-mentioned three image pickup modes. In this example, the effective number of pixels for the CCD image sensor is 864 (vertical) by 1,152 (horizontal) on a tetragonal-lattice basis.

In a motion-picture mode in FIG. 4A, an extra 20% of the entire area vertically and horizontally is used for a camera-shake correction area. The effective area will be vertically and horizontally 80% of the original size. The pixel number reduction conversion is applied to an image signal for this area. For an NTSC color system image signal of 720 pixels (horizontal) by 240 lines (vertical) is output. For a PAL system image signal of 720 pixels (horizontal) by 288 lines (vertical) is output In still-picture modes in FIG. 4B and FIG. 4C, however, all effective pixels in the CCD image sensor are available for image output. The CCD needs to be operated to output more pixels than output pixels horizontally and vertically on a field basis. The CCD is operated at the same field frequency as for the output side. The CCD is operated at higher frequencies for horizontal frequency and horizontal transfer clocks than those for the output side.

In this embodiment, as shown in FIG. 5A, for the NTSC color system, the CCD is operated with 385 horizontal lines during a vertical synchronization period of 1/60 seconds and 1,430 clocks during one horizontal synchronization period, i.e. the clock frequency of 33 MHz. As shown in FIG. 5B, for the PAL system the CCD is operated with 375 horizontal synchronizations during a vertical synchronization period of 1/50 seconds and 1,440 clocks during one horizontal synchronization period, i.e. the clock frequency of 27 MHz. The timing generator 25 in FIG. 1 determines these settings.

In the motion-picture mode in FIG. 4A, the CCD outputs a field image signal. The system reads two mixed lines from the CCD image sensor by mixing two lines in the CCD image sensor for output. The system can provide a capability for correcting a camera shake. For this purpose, the system reads and extracts part of the CCD image sensor, and dynamically moves this extracted area using the remaining area in accordance with an amount of camera shake caused by a camera operator. The microcomputer detects an amount of camera shake by integrating outputs from the angular speed sensors for vertical and horizontal directions. An image signal resulting from the camera-shake correction comprises 960 pixels (horizontal) by 360 lines (vertical).

The number of these pixels is greater than that of pixels in the above-mentioned output image. This image signal is reduced to 720 pixels (horizontal) by 240 lines (vertical) for the NTSC color system or 720 pixels (horizontal) by 288 lines (vertical) for the PAL system.

FIGS. 6A~D is a timing chart for each signal in the motion-picture image pickup mode. FIG. 6A shows a vertical synchronization signal VD. FIG. 6B shows an image signal generated in the CCD image sensor 14. In FIGS. 6A~D, $t_1$, $t_4$, and $t_7$ are reference timings for the vertical synchronization signal VD. As shown in FIG. 6C, however, the above-mentioned camera-shake correction causes 80% of the vertical duration to be read as effective image periods ($t_2$ to $t_3$ and $t_5$ to $t_6$). The read-out signal is sent to the signal processing system and is subject to the above-mentioned pixel number conversion shown in FIG. 6D.

When the pixel number conversion block 30 in FIG. 1 reduces images by decreasing the number of pixels, the band limiting low-pass filter 31 limits the bandwidth so as to meet an output sampling frequency for prevention against an aliasing noise after the conversion. This operation is applied to both vertical and horizontal directions of an image signal. Thereafter, the pixel thinning circuit 32 thins pixels so as to meet the number of output pixels. The image signal then passes the pixel interpolating low-pass filter 33 for obtaining an output pixel centroid. This operation is also applied to both vertical and horizontal directions of the image signal, adjusting spatial positions of pixels. Namely, the pixel thinning circuit 32 and the pixel interpolating low-pass filter 33 determine a pixel value at an interpolated position. At this stage, the pixel signal is chronologically discontinuous. The signal is temporarily stored in the image memory 35, and then is sent to the clock crossover line memory 42 line by line. The signal is then read continuously at an output image clock (13.5 MHz) to create a final image. In FIGS. 6A~D, the image memory 35 and the line memory 42 are generically referred to as memory. Writing to this memory is fast and intermittent. The signal is continuously read in the next field at a specified clock (13.5 MHz) and is retrieved from the above-mentioned terminal 43 as a monitor output.

Enlarging images requires no limitations on the bandwidth. When an output signal is received from the camera signal processing circuit 19 via the selected terminal "b" of the selection switch 34, that signal is directly written to the image memory 35 with no modifications. An output signal from this image memory 35 is sent to the enlarged pixel interpolating low-pass filter 37 in which the number of pixels is increased. The signal is sent to the clock crossover line memory 42 via the selected terminal "b" of the selection switch 38 and is continuously read at a specified clock (13.5 MHz) for output.

Vertical extraction for the above-mentioned camera-shake correction is performed during a vertical transfer for the CCD. Horizontal extraction is performed during writing to memory in the pixel number conversion block. An extra area for camera-shake correction is reserved 20% of the entire area vertically and horizontally. These operations are performed for each field.

As described later, it is possible to provide electronic zooming equivalent to zooming which uses an optical lens by finely, smoothly varying reduction rates for the pixel number conversion block 30.

Figure 7:
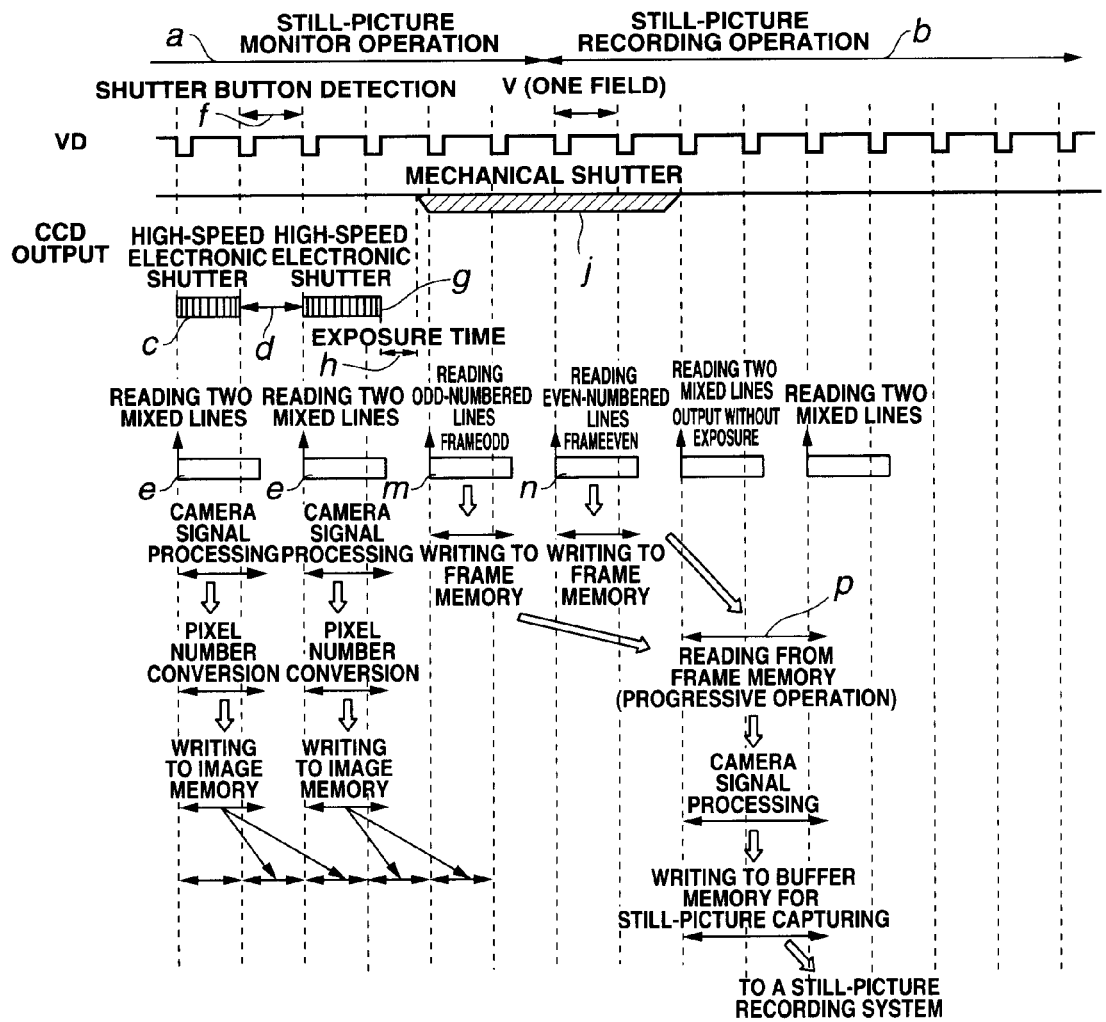
FIG. 7 is a timing chart describing operations in the still-picture mode.

The following describes operations in the still-picture mode. This mode includes still-picture monitor operations in the still-picture monitoring mode as shown in FIG. 4B and still-picture recording operations in the still-picture recording mode as shown in FIG. 4C. FIG. 7 illustrates a timing chart for describing these operations. In this figure, symbol "a" shows a period of still-picture monitor operations. Symbol "b" shows a period of still-picture recording operations.

The still-picture monitoring mode has not record operation and is chiefly used for setting image frames or confirming a focus or brightness. The still-picture monitoring mode does not perform the camera-shake correction with area extraction as in the motion-picture mode to use as many pixels as possible. As shown in FIG. 4B, this mode reads all of effective pixels, namely 1,152 pixels (horizontal) by 864 lines (vertical), from the above-mentioned CCD image sensor 14. Actually, this mode reads 432 lines by mixing two lines vertically. For output, an image signal of 1,152 pixels (horizontal) by 432 lines (vertical) is reduced to 720 pixels (horizontal) by 240 lines (vertical) for the NTSC color system or 720 pixels (horizontal) by 288 lines (vertical) for the PAL system.

The still-picture monitor operation period "a" in FIG. 7 includes a high-speed electronic shutter period "c" and an exposure period "d" at an interval of two vertical periods (2V=2 fields). An electric charge accumulated in the CCD is discarded during the high-speed electronic shutter period "c". An image signal exposed during the exposure period "d" is read with two lines mixed in the next vertical period and the later. As described in FIG. 5A and FIG. 5B, 385 lines are read for the NTSC system or 375 lines are read for the PAL system during one field of CCD read clocks. As shown in FIG. 4B, it is impossible to read all 432 lines which are read from the CCD with two lines mixed during just a single field. As shown in FIG. 7, a period "e" exceeds one field. When an image signal is read with two lines mixed, this signal is submitted to the camera signal processing and the pixel number conversion. Then, the signal is written to the image memory and is read as a motion picture signal in compliance with a specified motion picture format such as a DV format. Omitted here is the description about operations for the camera signal processing, the pixel number conversion, and writing to or reading from the image memory. These operations are same as those in the motion-picture mode except the number of pixels to be converted from is 1,152 pixels (horizontal) by 432 lines (vertical).

The still-picture recording mode records still pictures after the above-mentioned still-picture monitoring mode determines image frames, brightness, and focus positions. When reading from the CCD in this mode, the system does not mix two lines. After the exposure for a specified time, the system closes a mechanical shutter and reads even-numbered and odd-numbered lines independently at different times. There are reasons for reading even-numbered and odd-numbered lines at different times. Reading all pixels from the CCD at a time causes to double the number of vertical registers in the CCD, making it difficult to form CCD electrodes and provide advantages with respect to performance. When an image pickup apparatus supports both still and motion pictures and allows the use of the motion-picture mode, such a device needs to be complied with the motion-picture mode which demand reading a single image for each field. Reading pixels without mixing two lines decreases a CCD output level by half compared to reading two mixed lines as in the above-mentioned motion-picture mode or still-picture monitoring mode. The GCA (gain control amplifier) 16 in FIG. 1 amplifies an output level approximately twice as large as that in the motion-picture mode or still-picture monitoring mode and sends the amplified output to the A/D conversion circuit 17.

Figure 8:
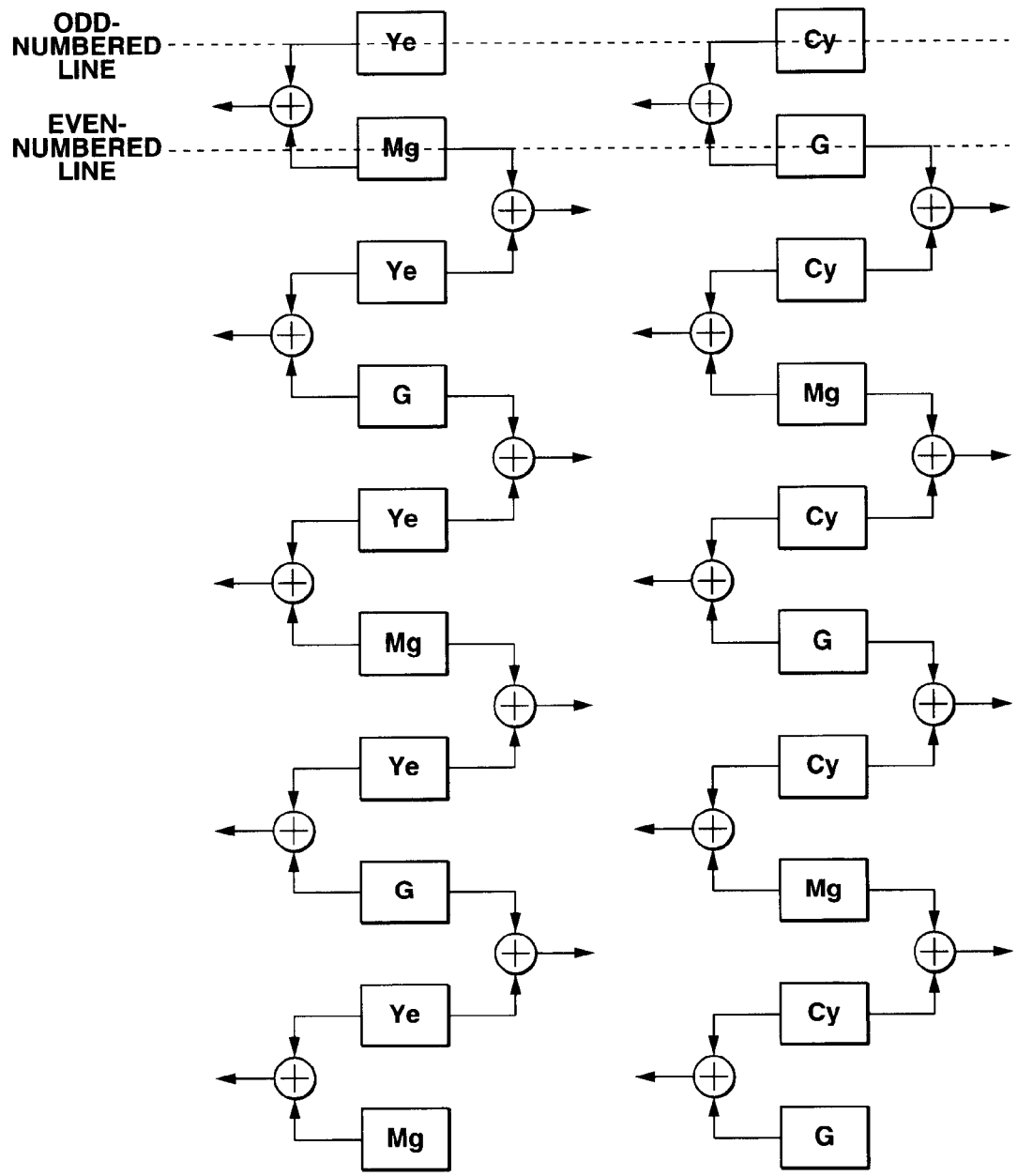
FIG. 8 illustrates a 2-line addition operation during reading from frame memory.

FIG. 4C shows the number of pixels in the still-picture recording mode. The system reads 1,152 pixels (horizontal) by 864 lines (vertical) in two operations, namely 432 even-numbered lines and 432 odd-numbered lines. The system then writes these pixels in the frame memory 21 in FIG. 1. The system alternately reads even-numbered and odd-numbered lines for progressive operations, thus providing a still picture of 1,152 pixels (horizontal) by 864 lines (vertical). The still picture recording preprocessing circuit 23 in FIG. 1 converts this still picture of 1,152 pixels (horizontal) by 864 lines (vertical) into a signal format which is capable of same processing as the camera signal processing in the motion picture mode. Specifically, the still picture recording preprocessing circuit performs this operation by adding two lines as shown in FIG. 8 instead of mixing two lines when reading from the CCD. As shown in FIG. 8, unlike in the motion-picture mode or still-picture monitoring mode, the 2-line addition provides a still picture with the same number of lines as the number of effective lines in the CCD by adding an even-numbered line to an odd-numbered line, an odd-numbered line to an even-numbered line, an even-numbered line to an odd-numbered line, an odd-numbered line to an even-numbered line, and so on. Like in the motion-picture mode, the system performs camera signal processing for this still picture. The system reduces the still picture to a VGA-size image (640 by 480) as needed. Alternatively, the system just outputs the still picture as a megapixel image (1,152 by 864) to the still picture recording system via the output terminal 47 in FIG. 1.

The following describes the above-mentioned still-picture recording operation with reference to the still-picture recording operation period "b" in FIG. 7. A shutter button operation is detected during a shutter button detection period "f" in the above-mentioned still-picture monitor operation period "a". An exposure operation takes place during an exposure time "h" between a high-speed electronic shutter period "g" which is just after the shutter button detection period "f" and a close period "j" for the mechanical shutter 12 in FIG. 1. This exposure time "h" is determined by the end of the high-speed electronic shutter period "g" and the beginning of the close operation for the mechanical shutter 12. Specifically, an exposure time or a shutter speed is determined by adjusting the timing for the end of the high-speed electronic shutter period "g". An image is exposed during this exposure time "h" and is picked up. As described above, the image is read in accordance with an odd-numbered line read period "m" and an even-numbered line read period "n". These lines are respectively written to the frame memory 21 in FIG. 1. During a period "p" after completion of these write operations, the system performs progressive reading in the above-mentioned order of lines and still-picture preprocessing (2-line addition) for the image. The system performs the camera signal processing similar to the motion-picture mode and the pixel number conversion as needed. Thus processed image is then written to the still picture capturing buffer memory 46 in FIG. 1. The still-picture image written to the still picture capturing buffer memory 46 is read at the timing or data rate which complies with a request from the still picture recording system. The read image is sent to the still picture recording system via the output terminal 47 and is stored therein.

Figure 9:
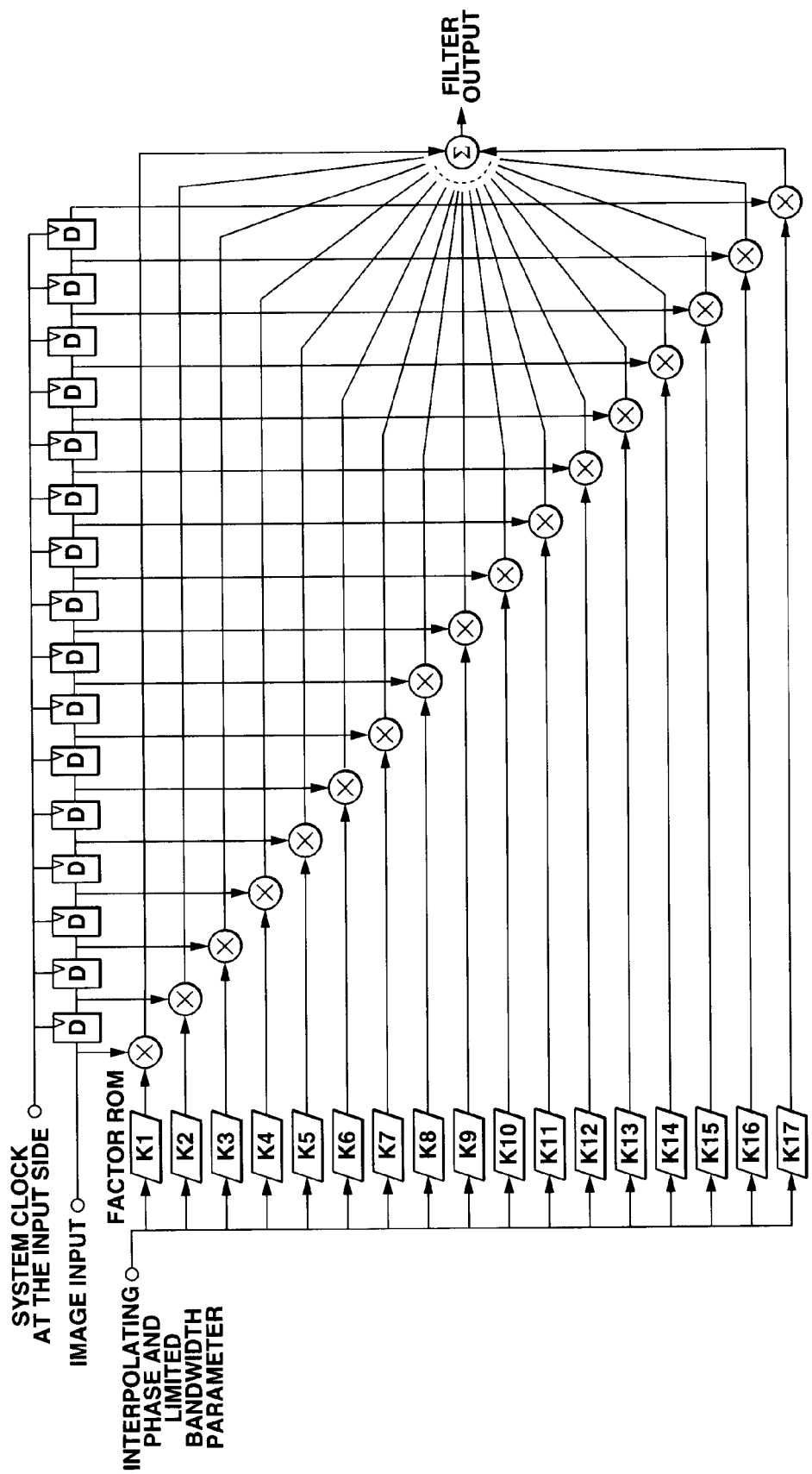
FIG. 9 shows a basic configuration of a digital filter.

FIG. 9 shows a basic configuration of a filter used as a band limiting low-pass filter 31, a reduced pixel interpolating low-pass filter 33, and a enlarged pixel interpolating low-pass filter 37 in FIG. 1. FIGS. 10A~C and 11 provide examples of factors K1 to K17 for this filter.

FIG. 9 shows the basic scheme of a 17-tap FIR (finite impulse response) digital filter. The hardware filter comprises 16 delay devices, 17 factor ROMs, 17 multipliers, and one sum adder. As long as a necessary operation speed is satisfied, it is allowed to read 17 factors from a single factor ROM or implement part or all of the filter using the software. As far as the above-mentioned delay devices are concerned, a vertical filter for images uses 1H (1-line) delay devices such as line memory and delay lines. A horizontal filter uses 1-pixel delay devices such as D-flip-flops.

Figure 10:
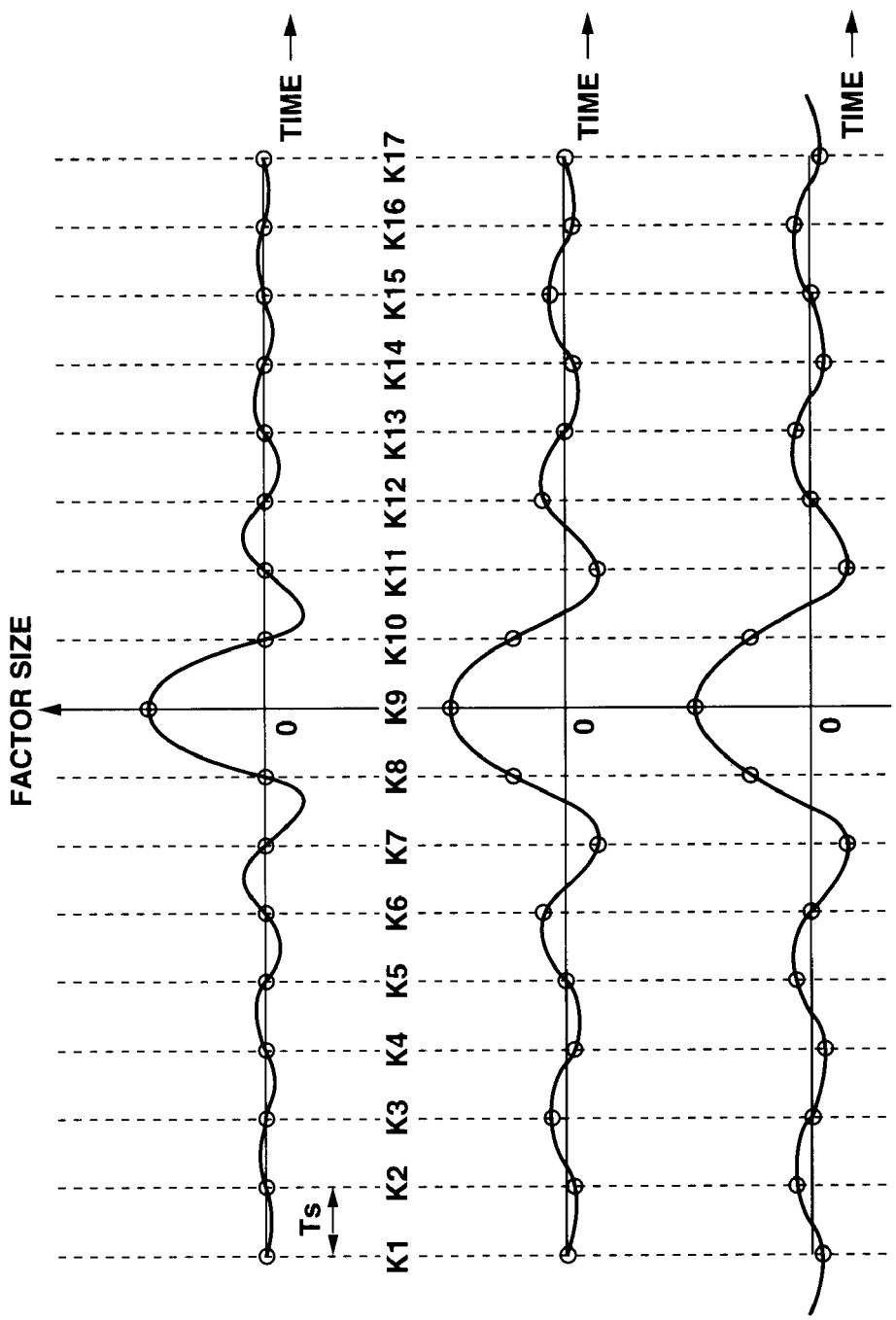
FIG. 10 illustrates each factor for a digital filter comprising a band limiting lowpass filter.

FIGS. 10A–C illustrates factors K1 to K17 for the band limiting low-pass filter. FIG. 10A provides filter factor samples in the band limiting low-pass filter for the pixel number conversion with a magnification of 1 or more. FIG. 10B provides these filter factor samples for the reduced pixel number conversion with a magnification of ¾. FIG. 10C provides these filter factor samples for the reduced pixel number conversion with a magnification of ⅔. This example uses as many as 17 taps for limiting the bandwidth with minimal degradation of frequency characteristics. Each tap factor (filter factor) uses digital values for a sinX/X curve, also called a sinc function. In the example of FIGS. 10A–C, the above-mentioned sinc function is multiplied by a windowing function to limit the number of taps to 17.

Figure 11:
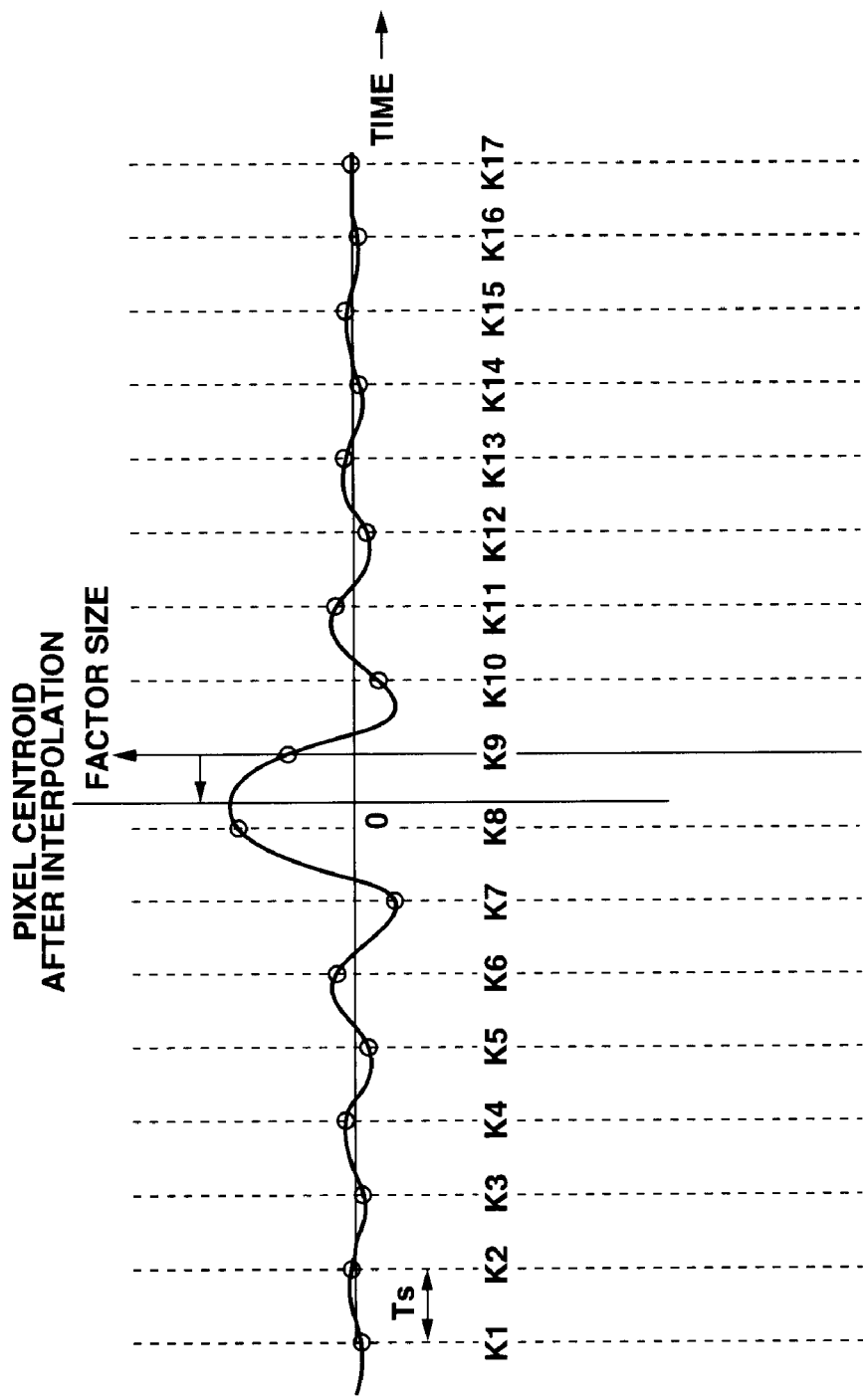
FIG. 11 illustrates each factor for a digital filter comprising a pixel interpolating low-pass filter.

FIG. 11 shows factors K1 to K17 constituting the pixel interpolating low-pass filter. A value for the pixel centroid in the figure can be obtained by selecting factors K1 to K17 so that a pixel centroid after the interpolation becomes the peak (center) of the above-mentioned sinc function.

Figure 12:
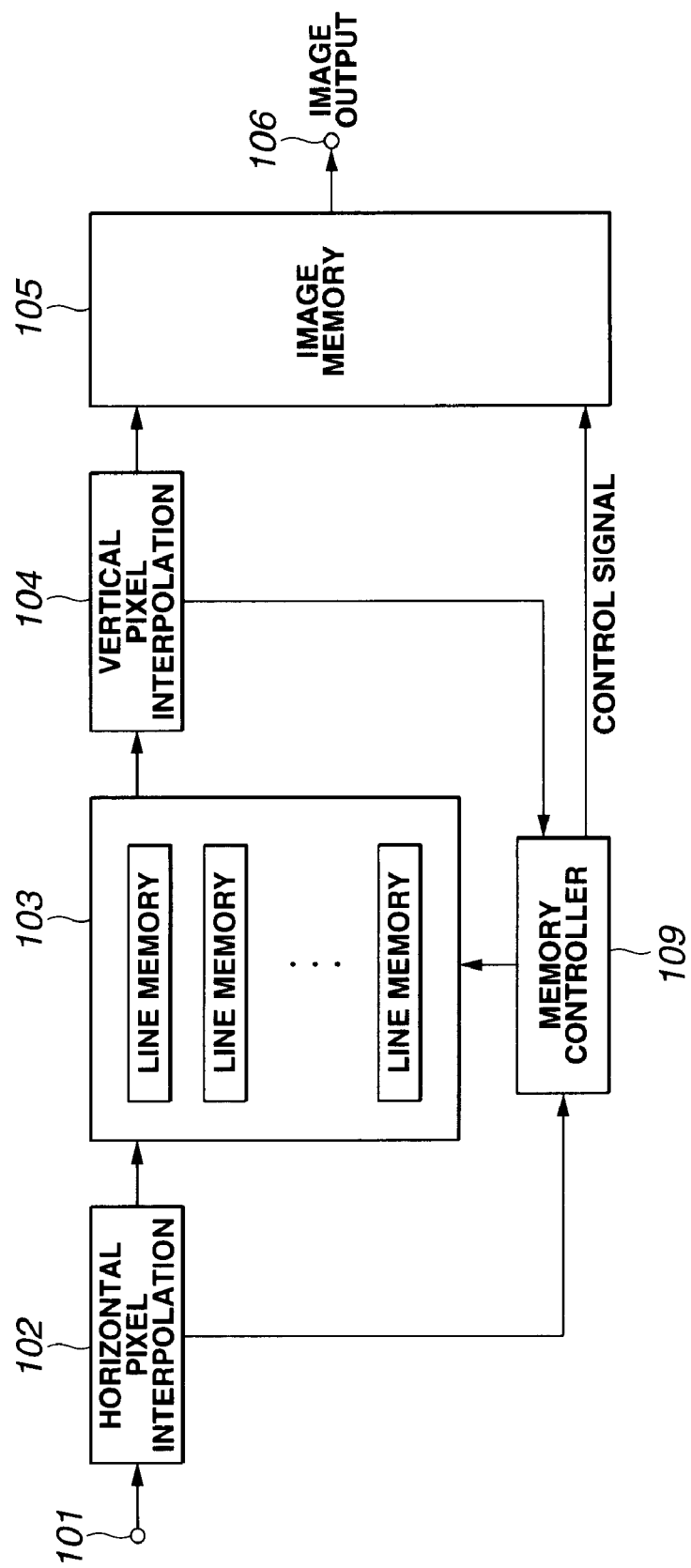
FIG. 12 is a block diagram showing a practical configuration of the pixel interpolating filter.

FIG. 12 shows a practical configuration of the pixel interpolating filter. This example can be used as a reduced pixel interpolating low-pass filter 33 in FIG. 1.

In FIG. 12, an input terminal 101 is provided with an output signal, say, from the pixel thinning circuit 32 in FIG. 1. This signal is supplied to a horizontal pixel interpolating filter 102. The horizontal pixel interpolating filter 102 has a configuration similar to above-mentioned FIG. 9. In this case, each delay device in FIG. 9 is a 1-pixel delay device such as a D-flip-flop. When the horizontal pixel interpolating filter 102 interpolates the signal between horizontal pixels, the interpolated signal is sent to a line memory circuit 103, and then to a vertical pixel interpolating circuit 104. The line memory circuit 103 and the vertical pixel interpolating circuit 104 form a vertical pixel interpolating filter which uses line delay devices as the above-mentioned delay devices in FIG. 9. An output therefrom is sent to, say, an image memory 105 equivalent to the image memory 35 in FIG. 1. A memory controller 109 is equivalent to, say, the memory controller 36 in FIG. 1. This memory controller controls writing to or reading from the line memory 103 or the image memory 105 based on control signals such as write disable signals sent from the horizontal pixel interpolating filter 102 or the vertical pixel interpolating circuit 104. At this point, it is possible to provide so-called zooming by smoothly varying reduction rates, by finely, almost continuously varying the above-mentioned filter factors.

FIGS. 13A, B to 16A, B provide examples of frequency characteristics and displayable image ranges when reduction rates are changed. For simplifying illustrations and descriptions about the examples in FIGS. 13A, B to 16A, B, a CCD-generated input image is horizontally and vertically doubled to a so-called DV-format output image. Namely, the input image comprises 1,440 pixels (horizontal) by 980 lines (vertical) while the output image comprises 720 pixels (horizontal) by 480 lines (vertical).

The basic specification (SD specification) for DV formats standardizes a sampling frequency of 13.5 MHz. Half of that frequency, i.e. 6.75 MHz, is used for a signal reproduction bandwidth. It is possible to provide image pickup up to an optically higher frequency bandwidth by using a CCD image sensor having sufficiently more pixels than those for output images which comply with this specification. For example, such a CCD image sensor can have 1,440 pixels (horizontal) by 980 lines (vertical) or 1,152 pixels (horizontal) by 864 lines (vertical) as in the above-mentioned embodiment. There is little degradation in frequency characteristics for an output image during an output operation with the pixel number conversion in the reduction direction.

Figure 15A:
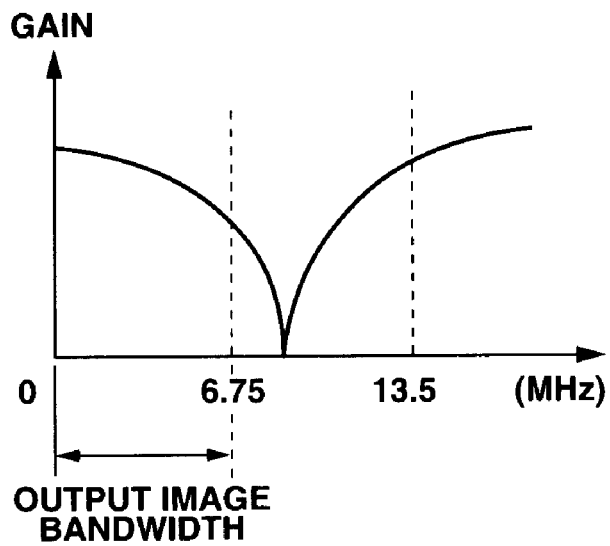
FIG. 15A shows frequency characteristics when a reduction rate is set to ¾.
Figure 15B:
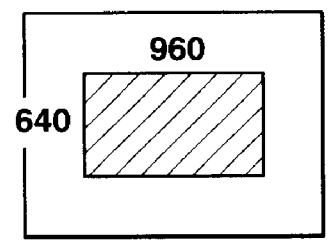
FIG. 15B shows a displayable image range when a reduction rate is set to ¾.
Figure 16A:
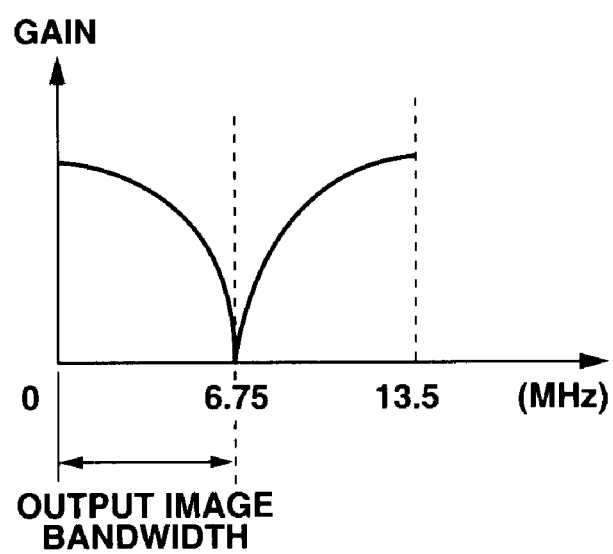
FIG. 16A shows frequency characteristics when a reduction rate is set to 1 (original size)
Figure 16B:
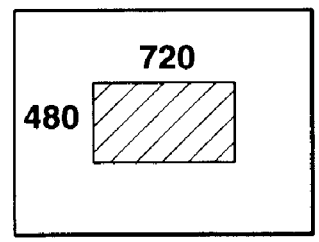
FIG. 16B shows a displayable image range when a reduction rate is set to 1 (original size)

FIGS. 13A, B shows how an input image is output by means of the reduced pixel number conversion at a rate of ½. An entire area for the input image is used in the above-mentioned CCD image sensor having 1,440 pixels (horizontal) by 980 lines (vertical). FIG. 13A shows frequency characteristics. FIG. 13B shows an area (shaded portion) used for output images. FIG. 14A, B shows how an input image is output by means of the reduced pixel number conversion at a rate of ⅗. The system extracts 1,200 pixels (horizontal) by 800 lines (vertical) out of 1,440 pixels (horizontal) by 980 lines (vertical) which form the above-mentioned effective image pickup area in the CCD image sensor. FIG. 14A shows frequency characteristics. FIG. 14B shows an area (shaded portion) used in the output image. Similarly, FIGS. 15A, B shows how an input image is output at a reduction rate of ⅔. The system extracts 960 pixels (horizontal) by 640 lines (vertical) out of 1,440 pixels (horizontal) by 980 lines (vertical). FIG. 15A shows frequency characteristics. FIG. 15B shows an available area (shaded portion). In FIG. 16, the system extracts 720 pixels (horizontal) by 480 lines (vertical) equivalent to an output image from 1,440 pixels (horizontal) by 980 lines (vertical) for an input image. The extracted image has the same size as the output image (shaded portion) indicated in FIG. 16B. FIG. 16A shows frequency characteristics for this image output without reduction.

Of these FIGS. 13A, B to 16A, B, the example of extraction with no reduction or enlargement in FIG. 16 provides almost same frequency characteristics as those of the prior art. Examples in FIGS. 13A, B to 15A, B use the pixel number conversion in the reduction direction. As seen from frequency characteristics A in each of these figures, a large signal level is available for high frequency components within an output image bandwidth ranging from 0 to 6.75 MHz. In this case, changing conversion rates causes little degradation in resolutions. It is possible to provide zooming which is approximately equivalent to zooming through the use of an optical lens by finely varying reduction rates for an electronic pixel conversion. This allows a digital camera using a single focus to implement zooming with little image quality degradation. It is also possible to further enhance zoom magnifications for a digital camera using an optical zooming lens.

As already described with reference to FIG. 1, the image pickup apparatus according to the above-mentioned embodiment of the present invention improves high-frequency characteristics and resolutions in output images. Thereby, the image pickup apparatus raises a frequency corresponding to a null point for the optical low-pass filter to a high frequency by using a CCD image sensor which has sufficiently many pixels compared to the number of pixels in an output image. The image pickup apparatus also performs a pixel number conversion including an interpolating low-pass filter having as flat characteristics as possible up to high frequencies.

Figure 17A:
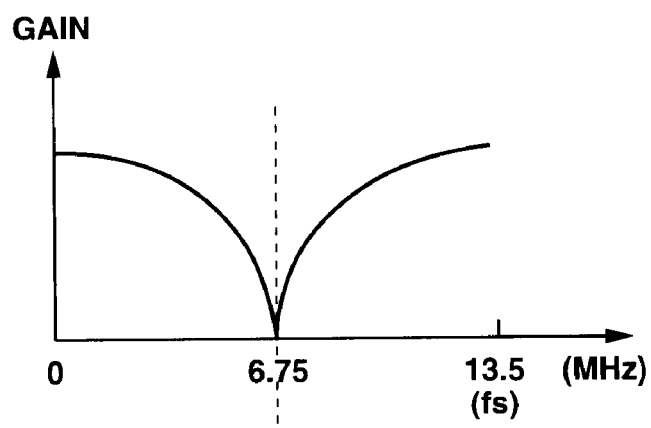
FIG. 17A shows optical low-pass filter characteristics when using a CCD image sensor having as many pixels as in an output image.

The following describes the principle of improving resolutions with reference to FIGS. 17A, B and 18A, C. When the CCD to be used has a pixel array which complies with the NTSC/PAL mode for output signal formats, a spatial sampling frequency for the CCD directly corresponds to an output sampling frequency in the DV format. The basic specification (SD specification) for DV formats provides a sampling frequency of 13.5 MHz. Based on this sampling frequency, FIGS. 17A, B and 18A~C depict frequency characteristics from an input to the CCD to an image output.

Figure 17B:
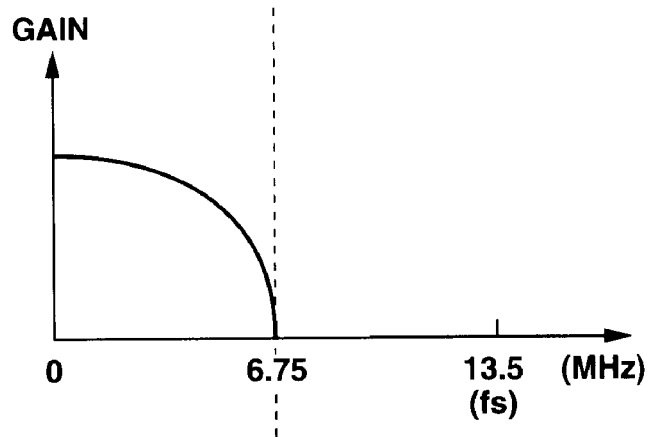
FIG. 17B shows output image frequency characteristics when using a CCD image sensor having as many pixels as in an output image.

FIGS. 17A, B shows the use of a CCD image sensor which supports almost the same number of pixels as that for conventional output images. FIG. 17 A shows frequency characteristics of an optical low-pass filter which complies with such a CCD image sensor. No optical gain remains around the critical resolution (6.75 MHz). This also causes a very small level around the critical resolution for frequency characteristics of the brightness signal for output images, thus degrading the resolution.

Figure 18A:
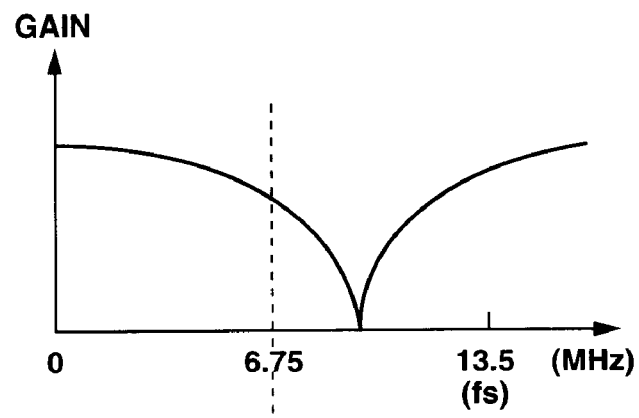
FIG. 18A shows optical low-pass filter characteristics when using a CCD image sensor having more pixels than in an output image.
Figure 18B:
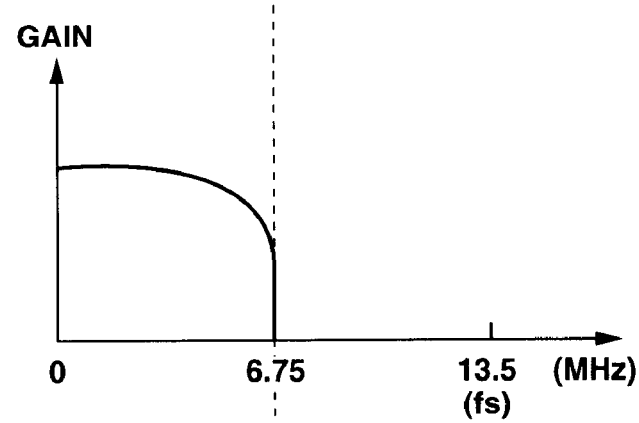
FIG. 18B shows pixel interpolating low-pass filter characteristics when using a CCD image sensor having more pixels than in an output image.
Figure 18C:
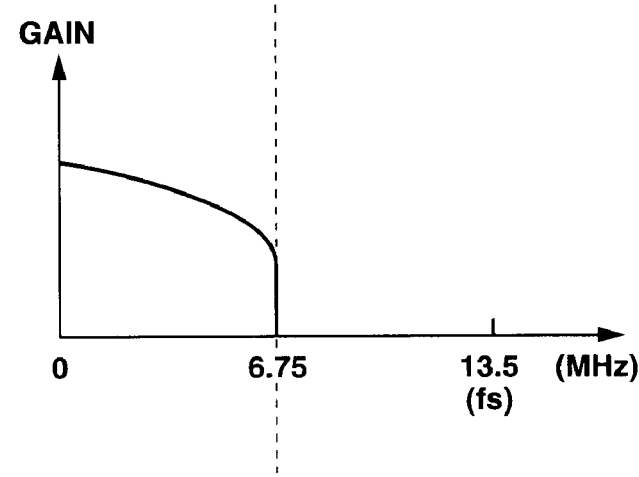
FIG. 18C shows output image frequency characteristics when using a CCD image sensor having more pixels than in an output image.

By contrast, FIGS. 18A~C shows the use of a CCD image sensor which complies with this embodiment and supports sufficiently more pixels than those in an output image. As shown in FIG. 18A, a large optical gain remains around the critical resolution (6.75 MHz) for frequency characteristics of an optical low-pass filter. FIG. B presents an example of frequency characteristics of a pixel interpolating low-pass filter for the above-mentioned pixel number conversion. As mentioned above, increasing the number of filter taps provides steep cut-off characteristics. As shown in FIG. 18C, a relatively large signal level remains around the critical resolution for frequency characteristics after the pixel number conversion, making it possible to generate an output image with high sharpness and high image quality.

The image pickup apparatus according to the above-mentioned embodiment of the present invention provides a still-picture monitoring mode for monitoring camera images before recording still pictures. In this mode, the image pickup apparatus outputs all pixels read from the CCD image sensor without thinning. The image pickup apparatus then performs the reduced pixel number conversion to generate a video output image signal for creating monitor images with excellent resolution.

There is a case of thinning part of pixels when images are read or monitored in the camera system which uses a CCD image sensor having more pixels than those in an output image. Specifically, the system performs a line thinning read operation which partially thins lines in the vertical direction. FIG. 19A illustrates a line thinning read operation for the CCD image sensor using the above-mentioned complementary mosaic color coding filter as shown in FIG. 2. In FIG. 19A, one line is read out of three lines. Performing such thinning at a 3-line interval provides an array of read pixel colors in the vertical direction in the same order as that for all pixels which are read, say, in the order of Ye, G, Ye, Mg, and so on. FIG. 19B shows the use of a trichromatic mosaic color coding filter for reading one of three lines. Also in this case, performing such thinning at a 3-line interval provides an array of read pixel colors in the vertical direction in the same order as that for all pixels which are read, say, in the order of R, G, R, B, and so on.

Figure 20A:
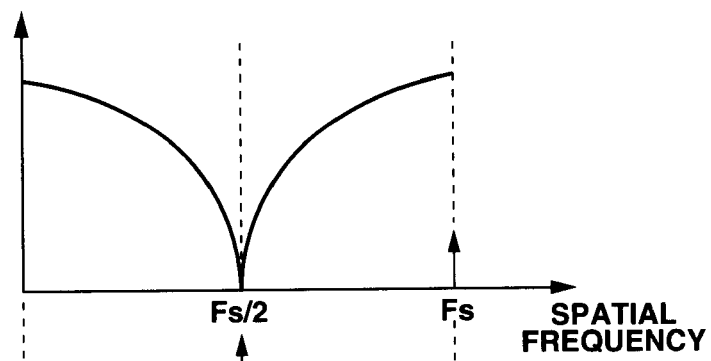
FIG. 20A illustrates unfavorable effects due to a line thinning operation when monitoring an image from the CCD image sensor.
Figure 20B:
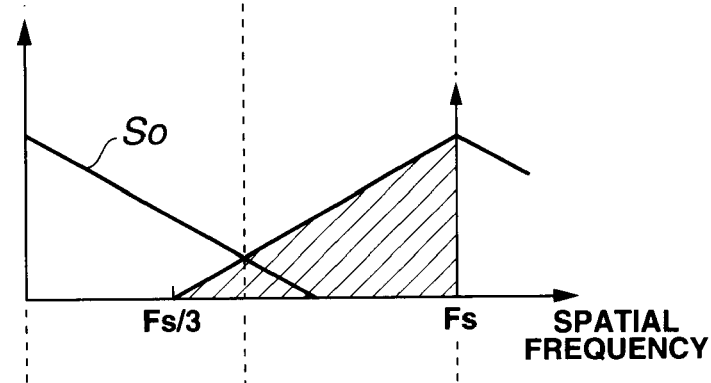
FIG. 20B illustrates unfavorable effects due to a line thinning operation when monitoring an image from the CCD image sensor.
Figure 20C:
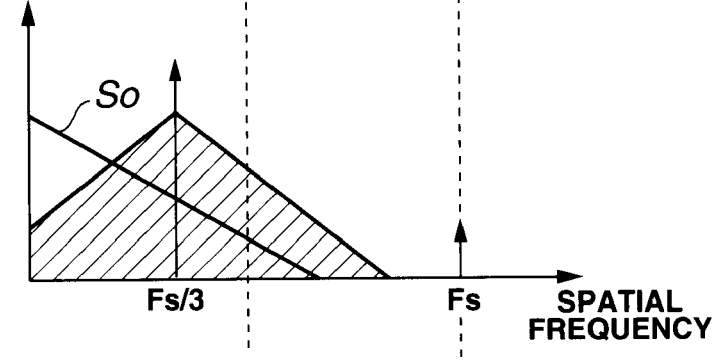
FIG. 20C illustrates unfavorable effects due to a line thinning operation when monitoring an image from the CCD image sensor.

However, it is not desirable to perform a thinning operation to read from the CCD image sensor because of unfavorable effects due to sampling aliasing components. FIGS. 20A~C illustrate unfavorable effects due to line thinning. FIG. 20A shows frequency characteristics of the optical low-pass filter installed before the CCD. FIG. 20(B) shows frequency characteristics when reading all pixels from the CCD. FIG. 20(C) shows frequency characteristics when reading one of three lines as mentioned above. In FIGS. 20A~C, "Fs" depicts a sampling frequency based on a pixel pitch; "So" indicates an original signal input to the CCD. A shaded portion in the figure shows an aliasing component due to sampling.

When all pixels are read from the CCD image sensor, just a small amount of aliasing components is mixed into a high-frequency portion of the output signal bandwidth as shown in FIG. 20B. As mentioned above, reading one of three lines is equivalent to sampling at a frequency of Fs/3. Even though the optical low-pass filter is used to limit the bandwidth as shown in FIG. 20A, a large amount of sideband components due to the sampling at Fs/3 is mixed into the output signal bandwidth. This gives bad effects to brightness and colors and remarkably degrades the image quality.

Figure 21:
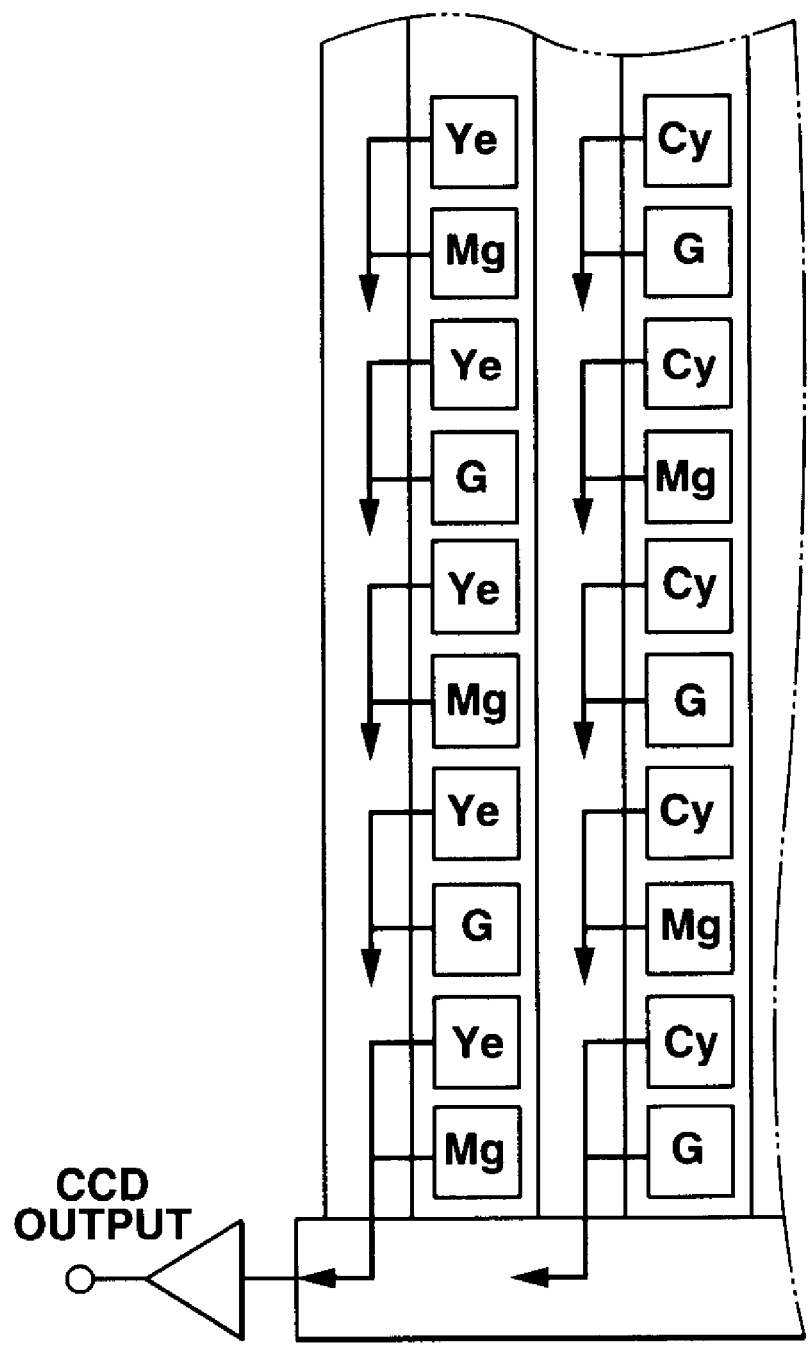
FIG. 21 illustrates reading two mixed lines in an image from the CCD image sensor.
Figure 22A:
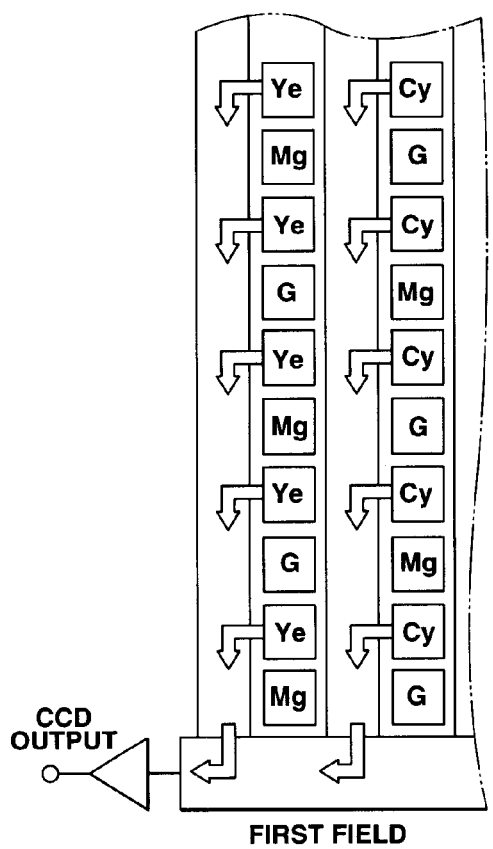
FIG. 22A illustrates reading all pixels in an image from a CCD image sensor for complementary mosaic color coding.
Figure 22B:
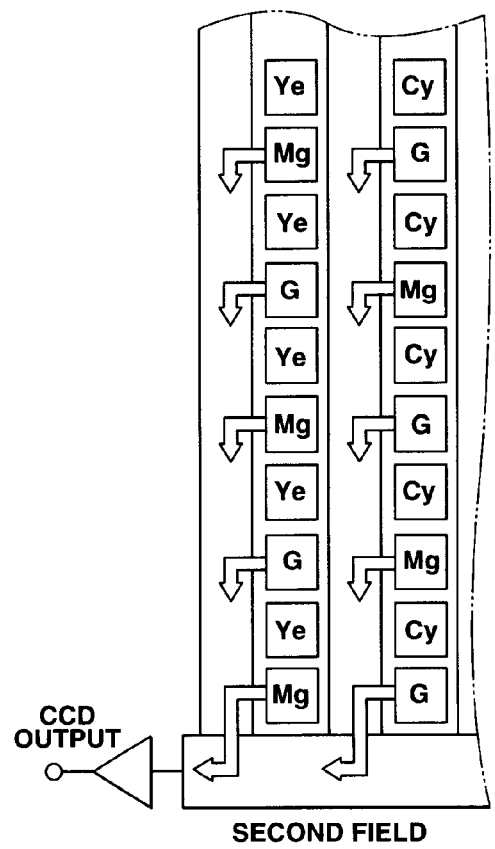
FIG. 22B illustrates reading all pixels in an image from a CCD image sensor for complementary mosaic color coding.
Figure 23A:
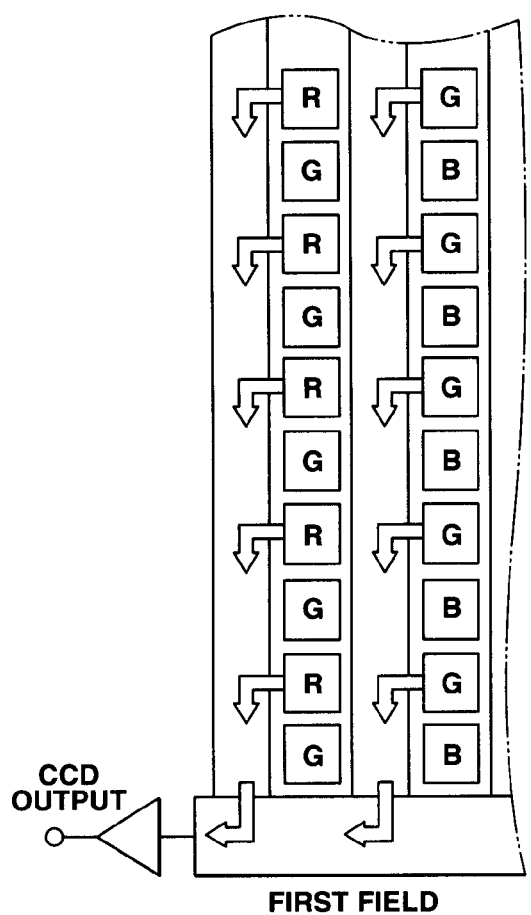
FIG. 23A illustrates reading all pixels in an image from a CCD image sensor for trichromatic mosaic color coding.
Figure 23B:
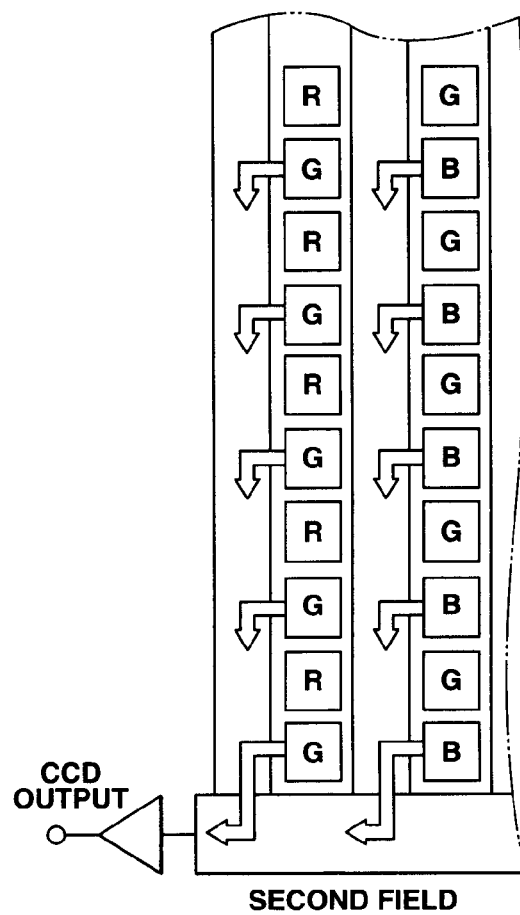
FIG. 23B illustrates reading all pixels in an image from a CCD image sensor for trichromatic mosaic color coding.

For reading all pixels independently, the embodiment of the present invention reads two mixed lines in the still-picture monitoring mode as shown in FIG. 21. This embodiment reads odd-numbered and even-numbered lines separately in the still-picture recording mode as shown in FIGS. 22A, B. Namely, the system reads two mixed lines from the CCD image sensor in FIG. 21. When reading all pixels independently, the system performs operations as shown in FIG. 22A(A) and as shown in FIG. 22B(B) at different times. Operation (A) reads the first field on every other line. Operation (B) reads the second field on the remaining lines. Finally, the system outputs pixels from the frame memory in the order of these lines to read all pixels from the CCD image sensor. FIG. 22 shows an example of the CCD image sensor which uses a complementary mosaic color coding filter. As shown in FIGS. 23A, B, the system can read all pixels by means of a CCD image sensor which uses a trichromatic mosaic color coding filter.

As shown in FIG. 1, the GCA (gain control amplifier) 16 is installed before the A/D conversion circuit 17. In the still-picture recording mode, the CCD image sensor 14 outputs an image pickup signal without mixing two lines. The GCA 16 amplifies this image pickup signal approximately twice as large as in a motion picture mode. The GCA 16 can supply the A/D conversion circuit 17 with image pickup signals with the same level as monitoring mode, making it possible to decrease quantization errors due to the A/D conversion. This operation is described as follows with reference to FIGS. 24A~C.

Figure 24A:
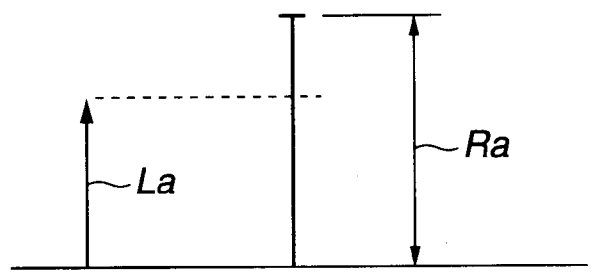
FIG. 24A illustrates operations of a GCA (gain control amplifier) installed before an A/D converter.
Figure 24B:
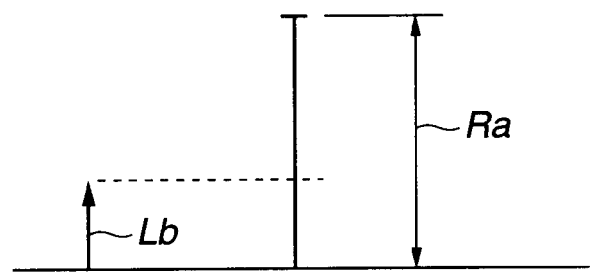
FIG. 24B illustrates operations of a GCA (gain control amplifier) installed before an A/D converter.
Figure 24C:
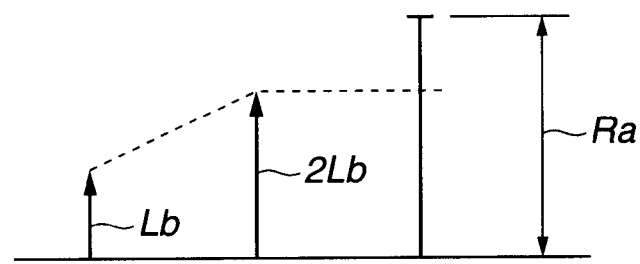
FIG. 24C illustrates operations of a GCA (gain control amplifier) installed before an A/D converter.

FIG. 24A shows an input signal (output signal from the GCA 16) level La versus an input range Ra in the A/D conversion circuit 17 when two mixed lines are read. FIG. 24B shows an input signal level Lb versus an input range Rb in the A/D conversion circuit 17 when all pixels are read independently. As shown in FIG. 24A, it is supposed that the input range Rb and the input signal level Lb are adjusted in the A/D conversion circuit 17 so that an appropriate A/D conversion can be applied to the signal level La when two mixed lines are read. The signal level Lb for independently reading all pixels becomes approximately half the signal level La for reading two mixed lines. Accordingly, the quantization accuracy decreases approximately by half. As shown in FIG. 24C, the GCA 16 in FIG. 1 doubles this signal level Lb to 2Lb. The system can provide the A/D conversion circuit 17 with almost the same input level as that for reading two mixed lines. Thus the system can improve the quantization accuracy to a degree which is applicable for the above-mentioned two-line mixed reading operation.

The still picture recording preprocessing circuit 23 processes a signal after the A/D conversion by adding two lines as mentioned above to create a similar signal for monitoring. The processed signal is sent to the camera signal processing circuit 19. Just adding lines makes this level almost twice as large as the monitoring level and increases a dynamic range on the signal processing side. The system halves the level by maintaining the word length. The system rounds the least significant bit in accordance with the input word length before passing the signal to the camera signal processing circuit 19.

The embodiment according to the present invention uses the above-mentioned multi-pixel CCD image sensor 14 whose pixel forms a tetragonal lattice. No pixel number conversion is needed for maintaining the aspect ratio when recording still pictures to be displayed on a PC (personal computer) monitor. When the number of pixels is converted before image recording, the same conversion ratio can be used vertically and horizontally, thus providing uniform frequency characteristics for vertical and horizontal images. Since the CCD can provide sufficiently many pixels for video signal output, the pixel number conversion in the reduction direction can generate an image with an extended bandwidth up to the high frequency. No pixel number conversion is needed for images to be displayed on a PC monitor, optimizing camera characteristics with no modifications. Further, it is possible to display a picture of vertically and horizontally balanced frequency characteristics. The system uses the CCD image sensor having many pixels enough for output images both for NTSC and PAL systems. The system is capable of motion picture output in compliance with both broadcasting systems by varying pixel number conversion ratios. The same CCD image sensor can be used for both NTSC and PAL systems by varying pixel number conversion ratios for each of these systems. This makes the system changeover easy and provides cost-effective advantages.

High-quality output images are available in both still-picture monitoring and recording modes.

The present invention is not limited to the above-mentioned embodiments. The above-mentioned embodiment uses the CCD image sensor having pixels equivalent to 1,152 pixels (horizontal) by 864 lines (vertical). The principle is to use more pixels than those in an output image. It is also possible to use a CCD having two megapixels or more. The pixel array for complementary mosaic color coding is not limited to the above-mentioned embodiment. The other arrays are also available. The present invention is applicable to the use of trichromatic color coding filters. It is further understood by those skilled in the art that various changes and modifications may be made in the present invention without departing from the spirit and scope thereof

What is claimed is:

1. An image pickup apparatus for receiving an input image and producing an output image, the image pickup apparatus comprising:
    an image pickup element having more pixels than those in the output image, said image pickup element configured to receive the input image and produce an intermediate image having a first number of pixels; and
    a pixel number conversion means configured to receive the intermediate image, said pixel number conversion means operating to reduce the first number of pixels in the intermediate image to produce the output image, said pixel number conversion means including:
        a horizontal pixel interpolating filter configured to interpolate signals between horizontal pixels,
        a plurality of line delay devices configured to store interpolated signals from said horizontal pixel interpolating filter,
        a vertical pixel interpolating filter, and
        a memory controller configured to selectively transmit stored interpolated signals from said plurality of line delay devices to said vertical pixel interpolating filter to interpolate signals between vertical pixels.

2. An image pickup apparatus according to claim 1 having motion-picture mode and still-picture mode,
    wherein the motion-picture mode is used for extracting a signal for said intermediate image containing fewer pixels than those in said image pickup element and more pixels than those in said output image from an image pickup area of said image pickup element and
    wherein the still-picture mode is used for reading the entire image pickup area in said image pickup element for generating a signal for said intermediate image.

3. An image pickup apparatus according to claim 2, wherein said motion-picture mode is used for extracting said intermediate image from the image pickup area of said image pickup element with camera-shake correction.

4. An image pickup apparatus according to claim 2, wherein said still-picture mode has a still-picture monitoring mode and a still-picture recording mode, wherein said still-picture monitoring mode is used for generating a signal for said intermediate image by reading two mixed lines from the image pickup area of said image pickup element, and wherein said still-picture recording mode is used for generating a signal for said intermediate image by independently reading all pixels from the image pickup area of said image pickup element.

5. An image pickup apparatus according to claim 1, wherein said image pickup element uses a CCD image sensor whose pixel forms a tetragonal lattice.

6. An image pickup apparatus according to claim 1, wherein said pixel number conversion means converts said intermediate image to output images based on different systems by changing reduction rates of signals.

7. An image pickup apparatus according to claim 1, wherein said pixel number conversion means provides zooming by changing conversion ratios of signals for said intermediate image.

8. An image pickup method for receiving an input image and producing an output image, the method comprising:
    providing an image pickup element having more pixels than those in the output image;
    configuring the image pickup element to receive the input image and to produce an intermediate image having a first number of pixels; and
    reducing the first number of pixels in said intermediate image to produce said output image by:
        interpolating signals between horizontal pixels,
        storing interpolated signals, and
        selectively transmitting stored interpolated signals to interpolate signals between vertical pixels.

9. An image pickup method according to claim 8, wherein said image pickup apparatus has a motion-picture mode and a still-picture mode comprising the steps of:
    using the motion-picture mode to extract a signal for said intermediate image containing fewer pixels than those for said image pickup element and more pixels than those for said output image from an image pickup area in said image pickup element; and
    using the still-picture mode to read the entire image pickup area in said image pickup element for generating a signal for said intermediate image.

10. An image pickup method according to claim 9, comprising the step of:

using said motion-picture mode to extract said intermediate image from the image pickup area of said image pickup element with camera-shake correction.

11. An image pickup method according to claim 9, wherein said still-picture mode has a still-picture monitoring mode and a still-picture recording mode, comprising the steps of:

using said still-picture mode to generate a signal for said intermediate image by reading two mixed lines from the image pickup area of said image pickup element, and using said still-picture recording mode to generate a signal for said intermediate image by independently reading all pixels from the image pickup area of said image pickup element.

12. An image pickup method according to claim 8, wherein said image pickup element uses a CCD image sensor whose pixel forms a tetragonal lattice.

13. An image pickup method according to claim 8, wherein reducing the first number of pixels in the intermediate image to produce the output image includes converting said intermediate image to output images based on different systems by changing reduction rates.

14. An image pickup method according to claim 8, wherein reducing the first number pixels in the intermediate image to produce the output image includes providing zooming by changing conversion ratios of signals from said intermediate image.

* * * * *